(12) United States Patent
Ouchi

(10) Patent No.: US 10,739,574 B2
(45) Date of Patent: Aug. 11, 2020

(54) STRUCTURED ILLUMINATION OPTICAL SYSTEM AND STRUCTURED ILLUMINATION MICROSCOPE DEVICE

(71) Applicant: NIKON CORPORATION, Tokyo (JP)

(72) Inventor: Yumiko Ouchi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/118,741

(22) Filed: Aug. 31, 2018

(65) Prior Publication Data

US 2018/0373012 A1    Dec. 27, 2018

Related U.S. Application Data

(63) Continuation of application No. 15/590,428, filed on May 9, 2017, now Pat. No. 10,095,018, which is a
(Continued)

(30) Foreign Application Priority Data

Jun. 29, 2011    (JP) .................. 2011-143686

(51) Int. Cl.
*H04N 7/18*    (2006.01)
*G02B 21/00*    (2006.01)
(Continued)

(52) U.S. Cl.
CPC ....... *G02B 21/0092* (2013.01); *G02B 6/2706* (2013.01); *G02B 21/14* (2013.01);
(Continued)

(58) Field of Classification Search
CPC .................. G02B 21/0092; G02B 6/2706; G02B 21/367; G02B 21/14; G02B 21/16; G02B 6/2848; H04N 5/2256
(Continued)

(56) References Cited

U.S. PATENT DOCUMENTS 5,878,152 A    3/1999    Sussman
6,025,905 A    2/2000    Sussman
(Continued)

FOREIGN PATENT DOCUMENTS

JP    2010-540999 A    12/2010
JP    2011-048070 A    3/2011
(Continued)

OTHER PUBLICATIONS

Oct. 24, 2014 Office Action issued in Japanese Application No. 2013-522439.
(Continued)

*Primary Examiner* — Shan E Elahi
(74) *Attorney, Agent, or Firm* — Oliff PLC

(57) ABSTRACT

An illumination optical system includes: a beam splitter located near a conjugate position of a specimen and configured to split beams from a light source into a plurality of groups of beams having different splitting directions around an optical axis; a beam selector configured to select and transmit one group of beams from the plurality of groups of beams and that is rotatable with respect to the optical axis; and a ½ wavelength plate located near the beam selector and rotatable about the optical axis. The rotation angles of the ½ wavelength plate and of the beam selector about the optical axis are respectively set so that the polarization direction of the beam which has passed through the ½ wavelength plate is perpendicular to the splitting direction of the one group of beams that has been selected by the beam selector and split by the beam splitter.

7 Claims, 13 Drawing Sheets

Related U.S. Application Data continuation of application No. 14/132,777, filed on Dec. 18, 2013, now Pat. No. 10,067,328, which is a continuation of application No. PCT/JP2012/004156, filed on Jun. 27, 2012.

(51) Int. Cl.
*G02B 21/14* (2006.01)
*G02B 21/16* (2006.01)
*G02B 21/36* (2006.01)
*H04N 5/225* (2006.01)
*G02B 6/27* (2006.01)
*G02B 6/28* (2006.01)

(52) U.S. Cl.
CPC ........... *G02B 21/16* (2013.01); *G02B 21/367* (2013.01); *H04N 5/2256* (2013.01); *G02B 6/2848* (2013.01)

(58) Field of Classification Search
USPC .......................................................... 348/79
See application file for complete search history.

(56) References Cited

U.S. PATENT DOCUMENTS

| | | | |
|---|---|---|---|
| 6,239,909 B1 | 5/2001 | Hayashi et al. | |
| 6,429,975 B1 | 8/2002 | Sawai et al. | |
| 6,480,285 B1 | 11/2002 | Hill | |
| RE38,307 E | 11/2003 | Gustafsson et al. | |
| 7,474,447 B2 | 1/2009 | Horimai | |
| 7,528,942 B2 | 5/2009 | Nakano et al. | |
| 8,115,806 B2 | 2/2012 | Osawa et al. | |
| 8,389,893 B2 | 3/2013 | Kempe et al. | |
| 8,480,279 B2 | 7/2013 | Papac et al. | |
| 8,485,972 B2 | 7/2013 | Papac et al. | |
| 9,146,391 B2* | 9/2015 | Ouchi | G02B 21/06 |
| 9,170,424 B2 | 10/2015 | Takahashi et al. | |
| 9,176,333 B2 | 11/2015 | Yokoyama et al. | |
| 9,182,219 B1 | 11/2015 | Manassen et al. | |
| 9,690,085 B2 | 6/2017 | Dohi | |
| 2002/0140905 A1 | 10/2002 | Ouchi et al. | |
| 2003/0112528 A1* | 6/2003 | Sakamoto | G11B 7/127 359/719 |
| 2004/0027543 A1 | 2/2004 | Ouchi et al. | |
| 2004/0186382 A1* | 9/2004 | Modell | A61B 1/00059 600/473 |
| 2004/0228257 A1 | 11/2004 | Minami et al. | |
| 2005/0007605 A1 | 1/2005 | Ivarsson | |
| 2005/0018996 A1 | 1/2005 | Seo et al. | |
| 2005/0156813 A1 | 7/2005 | Adachi et al. | |
| 2005/0211881 A1* | 9/2005 | Ponomarenko | G02F 3/00 250/214 LS |
| 2005/0221710 A1* | 10/2005 | Shiroishi | B82Y 10/00 445/3 |
| 2005/0243280 A1 | 11/2005 | Ouchi et al. | |
| 2005/0285997 A1 | 12/2005 | Koyama et al. | |
| 2006/0187416 A1 | 8/2006 | Ouchi et al. | |
| 2006/0244950 A1* | 11/2006 | Wegmann | G01M 11/0285 356/124 |
| 2007/0076199 A1 | 4/2007 | Ode | |
| 2007/0164241 A1 | 7/2007 | Nakano et al. | |
| 2008/0117431 A1* | 5/2008 | Teramura | G01B 9/02004 356/511 |
| 2008/0158668 A1 | 7/2008 | Ouchi et al. | |
| 2008/0212999 A1* | 9/2008 | Masuda | G02B 26/124 399/158 |
| 2009/0040601 A1 | 2/2009 | Saito et al. | |
| 2009/0129236 A1* | 5/2009 | Nagatomi | G11B 7/1353 369/112.03 |
| 2009/0161706 A1 | 6/2009 | Nagano et al. | |
| 2009/0225407 A1 | 9/2009 | Nakayama et al. | |
| 2009/0268280 A1 | 10/2009 | Osawa et al. | |
| 2009/0296205 A1 | 12/2009 | Ouchi | |
| 2010/0014088 A1 | 1/2010 | Wiki | |
| 2010/0141750 A1 | 6/2010 | Osawa et al. | |
| 2010/0157422 A1 | 6/2010 | Ouchi et al. | |
| 2010/0224796 A1* | 9/2010 | Mertz | G02B 21/0056 250/459.1 |
| 2011/0007619 A1 | 1/2011 | Saito | |
| 2011/0051092 A1 | 3/2011 | Mashitani | |
| 2011/0110114 A1 | 5/2011 | Papac et al. | |
| 2011/0112377 A1 | 5/2011 | Papac et al. | |
| 2011/0194175 A1 | 8/2011 | Dougherty et al. | |
| 2012/0026311 A1 | 2/2012 | Ouchi et al. | |
| 2013/0100333 A1 | 4/2013 | Awatsuji et al. | |
| 2013/0342768 A1 | 12/2013 | Yokoyama et al. | |
| 2015/0317824 A1 | 11/2015 | Hayashi | |
| 2016/0320600 A1 | 11/2016 | Dake et al. | |

FOREIGN PATENT DOCUMENTS

| | | |
|---|---|---|
| WO | 2007/043314 A1 | 4/2007 |
| WO | 2009/031418 A1 | 3/2009 |

OTHER PUBLICATIONS

Dec. 10, 2015 US Office Action issued in U.S. Appl. No. 14/132,777.
English language translation Aug. 21, 2012 Written Opinion issued in PCT/JP2012/004156.
Aug. 21, 2012 International Search Report of International Application No. PCT/JP2012/004156.
Jun. 9, 2017 Office Action issued in U.S. Appl. No. 14/132,777.
Nov. 3, 2017 Office Action issued in U.S. Appl. No. 15/590,428.
Jan. 18, 2018 Office Action issued in U.S. Appl. No. 14/132,777.
Jun. 1, 2018 Notice of Allowance issued in U.S. Appl. No. 15/590,428.

\* cited by examiner

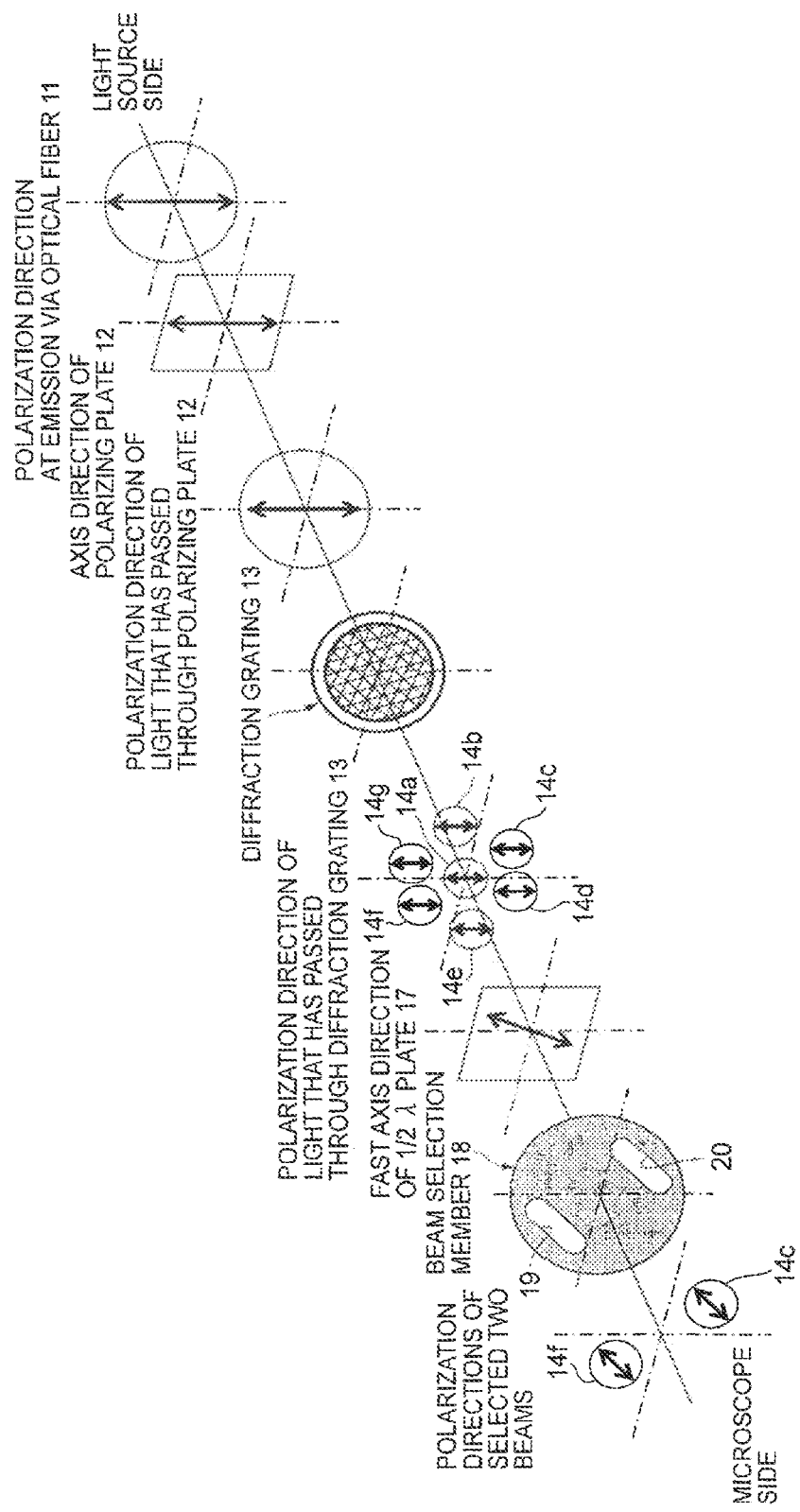

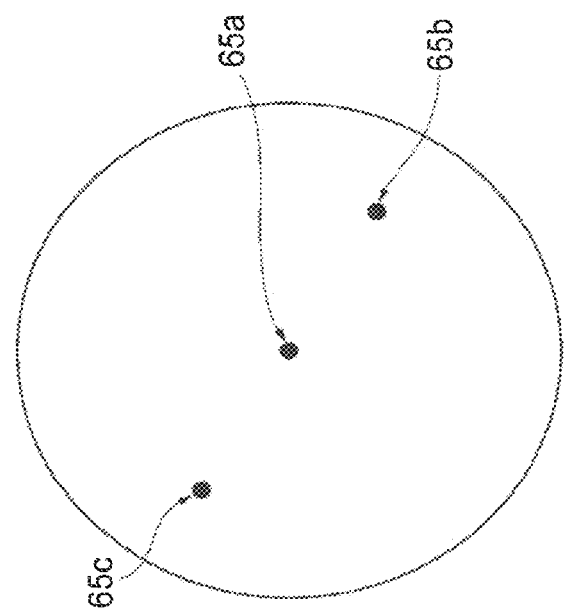
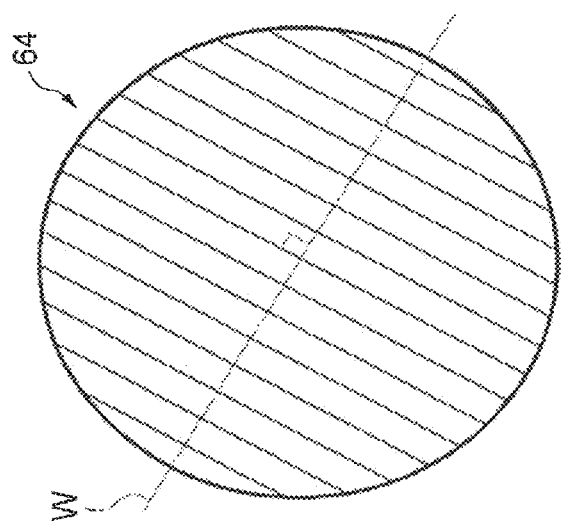

STRUCTURED ILLUMINATION OPTICAL SYSTEM AND STRUCTURED ILLUMINATION MICROSCOPE DEVICE

This is a continuation application of U.S. patent application Ser. No. 15/590,428 filed on May 9, 2017, which is a continuation of U.S. patent application Ser. No. 14/132,777, filed on Dec. 18, 2013, which in turn is a continuation of PCT International Application No. PCT/JP2012/004156, filed on Jun. 27, 2012, which is hereby incorporated by reference. This application also claims the benefit of Japanese Patent Application No. 2011-143686, filed in Japan on Jun. 29, 2011, which is hereby incorporated by reference.

TECHNICAL FIELD

The present invention relates to a structured illumination optical system and a structured illumination microscope device.

TECHNICAL BACKGROUND

Higher spatial resolution is demanded in the field of observation and measurement of a microstructure in a sample (specimen). As a method of enhancing the spatial resolution, a technique to image a sample with performing modulation using striped illumination light, and performing demodulation the image by image processing has been proposed (e.g. Patent Documents 1 and 2).

The sixth embodiment disclosed in Patent Document 1 is an example applied to a fluorescent observation device, and the optical system thereof splits illumination light, including coherent light, emitted from a light source using a beam splitting element, such as a diffraction grating, then collects the plurality of split illumination light beams at a pupil position of an object lens, and allows the beams to emit as parallel beams having deferent angles from the objective lens, so as to form interference fringes overlapping in a neighborhood of the observation object. By the illumination light modulated in stripes, diffracted light, including spatial frequency components of the shape formation of the observation object, which cannot be transmitted by the imaging optical system alone, can be used for imaging. Then by relatively modulating the phase of the split illumination light, interference fringes are moved on the observation object and a plurality of images is acquired, so as to form an image by image processing.

In concrete terms, phase modulation to move the interference fringes is performed by moving the beam splitting element in a direction perpendicular to the optical axis, or, according to another example, by inserting a wedge prism in one optical path of the illumination light and moving the wedge prism in a direction perpendicular to the optical axis.

According to the method disclosed in Patent Document 2, illumination light including coherent light emitted from a light source is introduced via an optical fiber, and is then split by a beam splitting unit, such as a diffraction grating, and the plurality of split illumination light is collected at a pupil position of an objective lens, so as to form interference fringes in a neighborhood of the observation object. Just like the above mentioned case, by the illumination light modulated in stripes, high frequency components of the shape information of the observation object, which cannot be transmitted by the imaging optical system alone, can be used for imaging. Further, just like the above mentioned case, a plurality of images is acquired so as to form an image by image processing.

In this method, in order to form one image, not only is a plurality of images acquired with modulating the phase of the illumination light, but also the images are acquired with changing the orientation of the interference fringes of the illumination light. This is because the high frequency components can be used for forming an image only when the structure has the same direction as the dire on of the interference fringes of the illumination light, therefore in order to reproduce the shape of the specimen that extends two-dimensionally, it is necessary to acquire and synthesize a plurality of images with changing the direction of the interference fringes.

In order to allow two or more beams to interfere in such a structured illumination, it is normally preferable that the beams are S-polarized light with respect to the interference plane. This is because the contras when S-polarized light beams are interfered is 1, regardless the incident angles, but contrast when P-polarized light beams enter attenuates in proportion to cos ($\Delta\theta$) with respect to a difference $\Delta\theta$ of the incident angles of the beams. The value of the contrast of the P-polarized light becomes negative when $\Delta\theta>90°$, which means that the contrast of the interference fringes is inverted.

Since a structured illumination microscope is a technique used for obtaining high resolution, it is desirable that the numerical aperture (NA) of the objective lens to be used is as large as possible and the fringe cycle of the structured illumination is as short as possible. As a result, the beam for the structured illumination enters the specimen at a large angle, therefore if there is a P-polarized light component, attenuation of the P-polarized light is large because the above mentioned $\Delta\theta$ is large, which deteriorates the structured illumination contrast.

PRIOR ARTS LIST

Patent Documents

Patent Document 1: U.S. Pat. No. 6,239,909(B1)
Patent Document 2: U.S. Reissue Pat. No. 38,307(E1)

SUMMARY OF THE INVENTION

Problems to be Solved by the Invention

A conventional method of solving a problem of deterioration of the structured illumination contrast is creating a non-polarized state by, for example, passing the light from the light source through a diffusion plate or oscillated multi-mode optical fiber, installing a polarizing plate, which rotates coaxially with the diffraction grating, in a neighborhood of the diffraction rating, and linearly polarizing the light in the non-polarized state using the polarizing plate such that the light enters as S-polarized light on the specimen. As a result, good structured illumination contrast is obtained, but approximately ½ of the quantity of light is blocked by the polarizing plate, and the light utilization efficiency becomes low, 50%.

With the foregoing in view, it is an object of the present invention to provide a structured illumination optical system and a structured illumination microscope that have a high efficiency to utilize the light from the light source.

Means to Solve the Problems

A structured illumination optical system according to an aspect of the present invention includes: a beam splitter that is disposed near a conjugate position of a specimen and configured to split beams from a light source into a plurality of groups of beams having different splitting directions around an optical axis of the structured illumination optical system; and a beam selector configured to select one group of beams from the plurality of groups of beams, the structured illumination optical system configured to form, on the specimen, interference fringes by a plurality of beams included in the one group of barns, and further including a ½ wavelength plate, wherein a fast avis of the ½ wavelength plate is set, based on the one group of beams selected by the beam selector, to a position displaced from a reference position by an angle θ/2, where θ is a difference between (i) a polarization direction of a beam that enters the ½ wavelength plate and (ii) a polarization direction of a beam that is to be emitted from the ½ wavelength plate.

A structured illumination optical system according to another aspect of the present invention includes: a beam splitter disposed near a conjugate position of a specimen and configured to split a beam from a light source into a plurality of beams; and a controller configured to control a splitting direction of the plurality of beams, the structured illumination optical system configured to form, on the specimen, interference fringes by the plurality of beams, and further including a ½ wavelength plate, wherein a fast axis of the ½ wavelength plate is set, based on the splitting direction of the plurality of beams, to a position displaced from a reference position by an angle θ/2, where θ is a difference between (i) a polarization direction of a beam that enters the ½ wavelength plate and (ii) a polarization direction of a beam that is to be emitted from the ½ wavelength plate.

A structured illumination microscope according to an aspect of the present invention includes: a structured illumination optical system according to any of the above aspects; a phase modulator configured to modulate a phase of the plurality of beams; an image optical system that forms an image of light from the specimen on an imaging plane of an imaging device; and an image processing unit that generates a specimen image by performing, arithmetic processing on a plurality of images imaged by the imaging device each time the phase modulator modulates the phase of the plurality of beams.

Advantageous Effects of the Invention

According to the present invention, most of the light from the light source can be used as S-polarized structured illumination light, and light efficiency can be enhanced.

BRIEF DESCRIPTION OF THE DRAWINGS

FIG. 5 is a schematic diagram depicting a function of an illumination optical system according to Embodiment 1;

FIG. 11A is a schematic diagram depicting a configuration of a diffraction gating that is used for Embodiment 3, and FIG. 11B is a schematic diagram depicting a diffracted light split by the diffraction grating;

DESCRIPTION OF THE EMBODIMENTS

Embodiments of the present invention will now be described with reference to the drawings. First, Embodiment 1 of the present invention will be described with reference to FIG. 1 to FIG. 7, and then Embodiment 2 of the present invention will be described mainly with reference to FIG. 8 and FIG. 9. Then Embodiment 3 of the present invention will be described with reference to FIG. 10 to FIG. 13. Finally Embodiment 4 of the present invention will be described with reference to FIG. 14.

Embodiment 1

Figure 1:
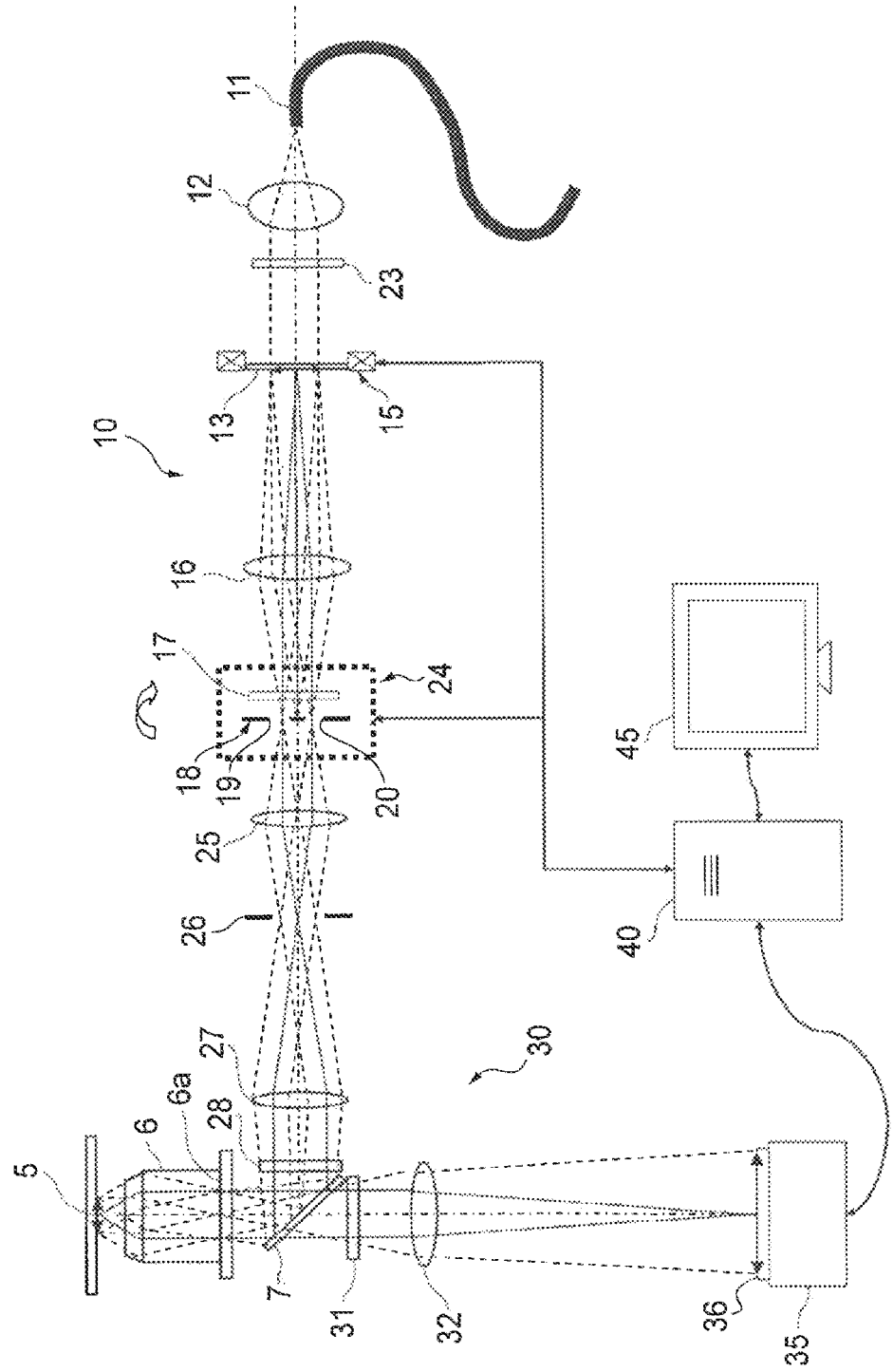
FIG. 1 is a diagram depicting an overview of an optical system of a structured illumination microscope device according to Embodiment 1 of the present invention.

As illustrated in FIG. 1, a structured illumination microscope device 1 according to Embodiment 1 is used, for example, as a fluorescent observation device that observes a specimen (sample) 5 having fluorescent properties, and is constituted mainly by an objective lens 6, a dichroic mirror 7, an illumination optical system 10 (structured illumination optical system according to this embodiment) that includes the objective lens 6 and the dichroic mirror 7, an image optical system 30 that also includes the objective lens 6 and the dichroic mirror 7, a picture element 35 (e.g. CCD, CMOS), an image storing and computing device 40, and an image display device 45.

The illumination optical system 10 includes, in order from the light source: an optical filer 11, a collector lens 12, a diffraction grating 13, a collective lens 16, a ½ wavelength plate 17, a beam selection member 18 (or beam selector), a lens 25, a field stop 26, a field lens 27, an exciter filter 28, a dichroic mirror 7 and an objective lens 6. The image optical system 30 includes, in other from an object (specimen 5): the objective lens 6, the dichroic mirror 7, a bather filter 31 and a second objective lens 32. The image storing and computing device 40 (or controller) is electrically connected with a translational driving device 15 and a rotational driving device 24, which are described later, so as to control operation of the translational driving device 15 and the rotational driving device 24, and constitute an image processing unit and a driving amount determining unit according to this embodiment.

The light five the light source (not illustrated) is guided by the optical fiber 11, and the light emitted from the optical fiber 11 is convened into parallel light by the collector lens 12. A laser light, for example, is used as the light source, since the illumination light must be coherent light. If the laser light is used, a polarization-preserving single mode fiber, for example, is used as the optical fiber 11.

In this embodiment, the polarizing plate 23 is disposed between the collector lens 12 and the diffraction grating 13. If the laser light is used as the light source, the polarization state thereof at the emitting end of the optical fiber 11 is approximately in a linearly polarized state, but it is preferable to pass the laser light through the polarizing plate 23 so as to remove other polarization components. The axis of the polarizing plate 23 is matched with the polarization plane (direction of the oscillation axis of the electric field) if the emitted light from the optical fiber 11 is polarized, but can be any direction if the emitted light from the optical fiber 11 is not polarized.

Figure 2B:
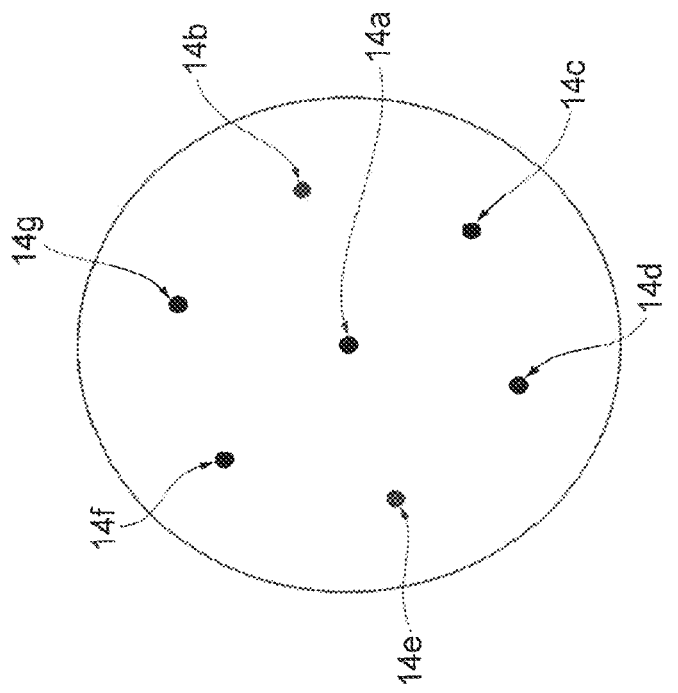
FIG. 2B is a schematic diagram depicting a diffracted light split by the diffraction grating.
Figure 2A:
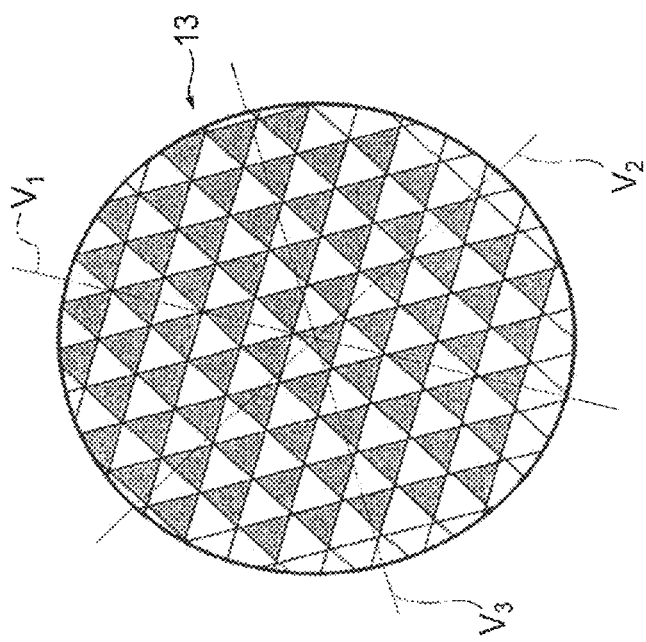
FIG. 2A is a schematic diagram depicting a configuration of a diffraction grating that is used for Embodiment 1.

The diffraction grating 13 constitutes the beam splitting unit (or beam splitter) according to this embodiment, and has a two-dimensional (triangular shaped) periodic structure spreading in a direction perpendicular to the optical axis of the illumination optical system 10, as illustrated in FIG. 2A. This periodic structure may be a periodic structure formed by using density (transmittance) or a periodic structure formed by using step difference (phase difference), but the phase difference type periodic structure is preferable in that the diffraction efficiency of the ± first order light is high.

The diffraction grating 13 splits the parallel light (coherent light) that enters from the collector lens 12 via the polarizing plate 23 into a plurality of groups (three groups in this embodiment) of beams having different split directions ($V_1$ to $V_3$ indicated by dashed lines in FIG. 2A) around the optical axis, and generates, in the beams of each group, a plurality of diffracted lights (e.g. 0 order diffracted light and ± first order diffracted light) of which propagating directions (diffraction directions) are symmetric with respect to the optical axis. Each splitting direction $V_1$ to $V_3$ matches the direction of each wave vector of the diffraction grating 13 (direction perpendicular to the grid line (marked line) of the diffraction grating 13).

Each of the diffracted lights generated by the diffraction grating 13 is collected at a position within a pupil conjugate plane by the collective lens 16 illustrated in FIG. 1, according to the diffraction direction and the diffraction order of each diffracted light. For example, as illustrated in FIG. 2B, the 0 order diffracted light 14a is collected at the center of the pupil conjugate plane (position of the optical axis), and three + first order diffracted lights 14b, 14c and 14d and three − first order diffracted lights 14e, 14f and 14g are collected respectively with equal angle intervals (60° intervals in this embodiment) on a circle of which center is the 0 order diffracted light 14a (position of the optical axis). The 0 order diffracted light 14a and the ± first order diffracted lights 14g and 14d constitute a group of beams along the splitting direction $V_1$ (hereafter called "first group of beams"), the 0 order diffracted light 14a and the ± first order diffracted lights 14c and 14f constitute a group of beams along the splitting direction $V_2$ (hereafter called "second group of beams"), and the 0 order diffracted light 14a and ± first order diffracted lights 14b and 14e constitute a group of beams along the splitting direction $V_3$ (hereafter called "third group of beams").

As illustrated in FIG. 1, the diffraction grating 13 is constructed so that translational movement in a direction perpendicular to the optical axis of the illumination optical system 10 is possible by the translational driving device 15, such as a piezo motor (constitutes the phase modulation unit in this embodiment), and the phase of the illumination light is modulated by the translational movement (described in detail later).

The ½ wavelength plate 17 (see FIG. 1) transforms the polarization directions of the plurality of diffracted light (0 order diffracted light and ± first order diffracted lights) generated by the diffraction grating 13 into a predetermined direction of linearly polarized light respectively. The direction of the fast axis of the ½ wavelength plate 17 is set to a direction to be the S-polarized light when a predetermined group of beams (one of the first group of beams to the third group of beams), that is selected by the beam selection member 18 after passing through the ½ wavelength plate 17, is irradiated onto the specimen 5, specifically to a direction that is perpendicular to the splitting direction of a predetermined one group of beams (one of the three splitting directions, $V_1$ to $V_3$, indicated by dashed lines in FIG. 2A) selected by the beam selection member 18 (that is, a direction in which the polarization direction of the predetermined one group of beams that is selected is parallel with the tangential line of a circle which contacts the beams and of which center is the optical axis. The fast axis of the ½ wavelength plate refers to a direction of polarization in which phase delay is smallest when the polarized light passed through the ½ wavelength plate (this definition is the same hereinbelow).

Figure 6:
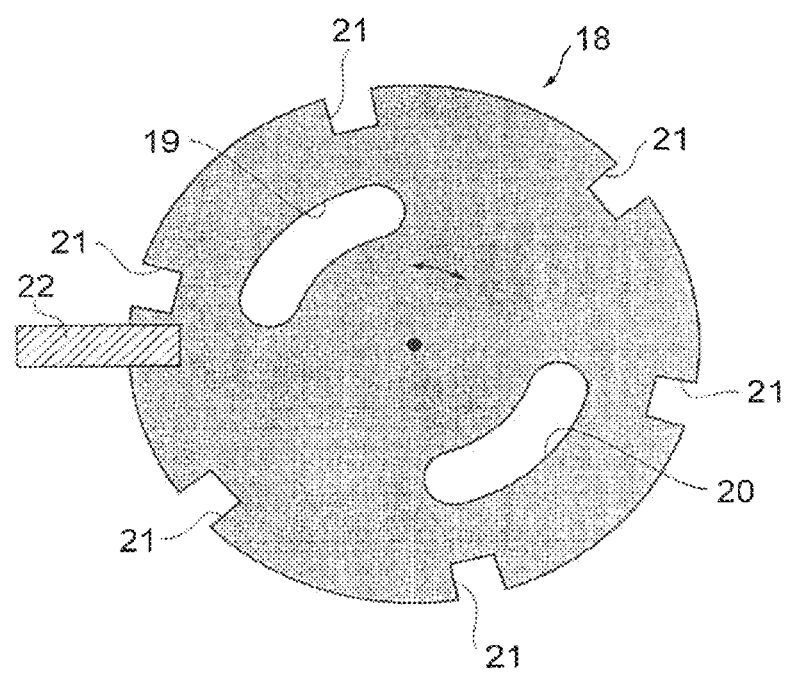
FIG. 6 is a diagram depicting a configuration of the beam selection member that is used for Embodiment 1.
Figure 7:
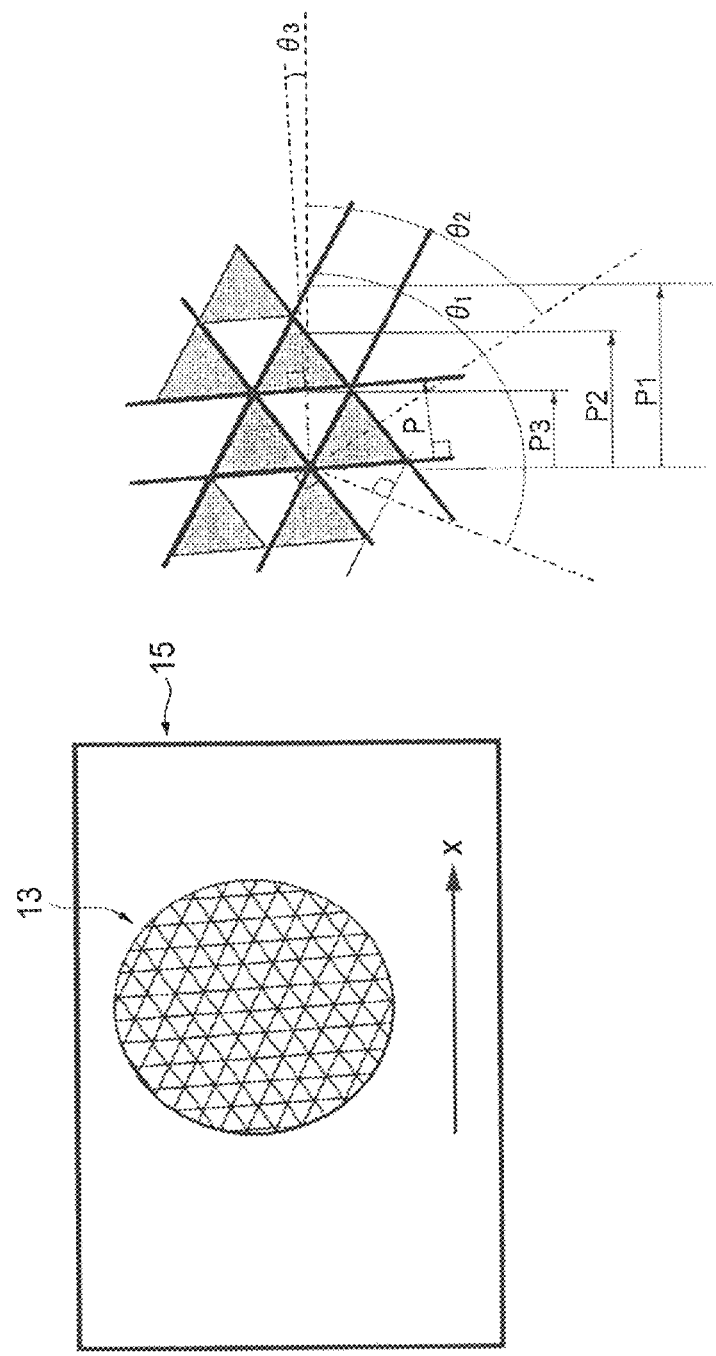
FIGS. 7A and 7B are diagrams depicting a method of phase modulation by the translational movement of the diffraction gating that is used for Embodiment 1 (FIG. 7A is a general view, and FIG. 7B shows a relationship between a direction of each wave vector and a moving distance)

As shown in FIG. 4 and FIG. 6, the beam selection member 18 is a disk having first and second apertures 19 and 20 where ± first order diffracted lights (linearly polarized lights) generated by the ½ wavelength plate 17 can pass through respectively, and is disposed near the pupil conjugate plane where the diffracted light is collected by the collective lens 16 (sue FIG. 1). The first aperture 19 and the second aperture 20 are formed symmetrically with respect to the center of the beam selection member 18, so that only a pair of ± first order diffracted lights (± first order diffracted lights that belong to one group of beams, out of the first group of beams to the third group of beams) disposed in symmetrical positions with respect to the optical axis of the illumination optical system 10 (that is, the propagating directions (diffraction directions) are symmetric with respect to the optical axis), out of the plurality of ± first order diffracted lights collected on the pupil conjugate plane (six ± first order diffracted lights 14b to 14g shown in FIG. 2B), can pass through the first aperture 19 and the second aperture 20.

In concrete terms, in MG. 2B, the beam selection member 18 selects one of the pairs of the ± first order diffracted lights 14g and 14d (belonging to the first group of beams) which are vertically symmetric with respect to the optical axis of the illumination optical system 10, the ± first order diffracted lights 14c and 14f (belonging to the second group of beams) which are symmetric inclining 120° to the right viewed from the microscope (60° to the left), and the ± first order diffracted lights 14b and 14e (belonging to the third group of beams) which are symmetric inclining 120° to the left viewed from the microscope (60° to the right), and the selected pair passes through the fast aperture 19 and the second aperture 20.

As illustrated in FIG. 1, the beam selection member 18 is constructed to be rotatable, together with the ½ wavelength plate 17 disposed near the beam selection member 18, around the center of the beam selection member 18 (optical axis of the illumination optical system 10) as a rotation axis, by the rotational driving device 24, which is an electric motor, for example, and by the rotation of the beam selection member 18, one pair of ± first order diffracted lights, out of the three pairs of ± first diffracted lights disposed symmetrically with respect to the optical axis of the illumination optical system 10, can be selected. In other words, diffracted light (± first order diffracted light) having desired diffraction direction and diffraction order can be selected by rotating the beam selection member 18, whereby the structured illumination direction can be selected.

On the other hand, the beam selection member 18 also has a function to cut off diffracted light of an unnecessary order (e.g. 0 order diffracted light 14a) out of the diffracted lights generated by the diffraction grating 13. In other words, in this embodiment, only ± fast order diffracted lights are used as the illumination light, and 0 order diffracted light and diffracted lights of the second or higher order are cut off by the beam selection member 18. The 0 order diffracted light indicated by the solid line in FIG. 1 therefore does not actually exist after the beam selection member 18, but is illustrated for convenience to clearly show the paths of the beams.

Figure 3A:
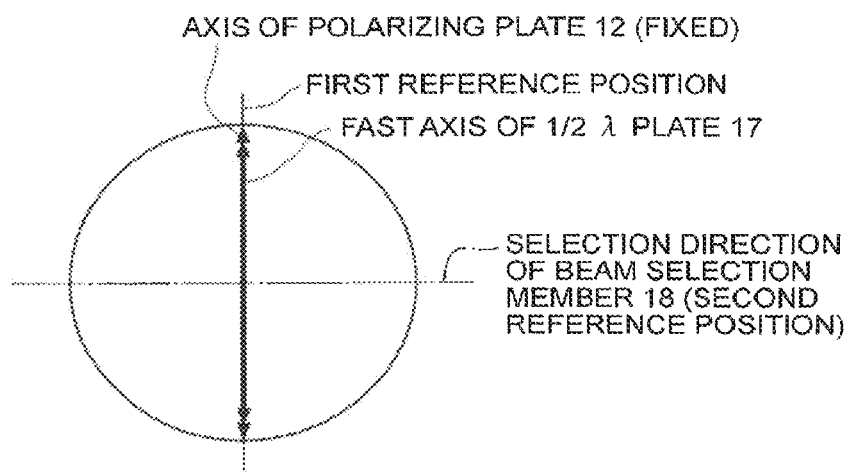
FIGS. 3A and 3B are diagrams depicting a relationship between ½ wavelength plate that is used for Embodiment 1 and each rotation angle of a beam selection member (FIG. 3A is a state of being in a reference position, and FIG. 3B is a state of being rotated from the reference position)

The rotation angles of the ½ wavelength plate 17 and the beam selection member 18 are controlled as follows. As illustrated in FIG. 3A, the reference position of the ½ wavelength plate 17 is a position where the direction of the fast axis thereof is parallel with the direction of the axis of the polarizing plate 23 (hereafter called "first reference position"), and the reference position of the beam selection member 18 is a position where the beam selection direction of the beam selection member 18 (direction of the line connecting the center of the first aperture 19 and the center of the second aperture 20) is perpendicular to the direction of the axis of the polarizing plate 23 (hereafter called "second reference position").

Figure 3B:
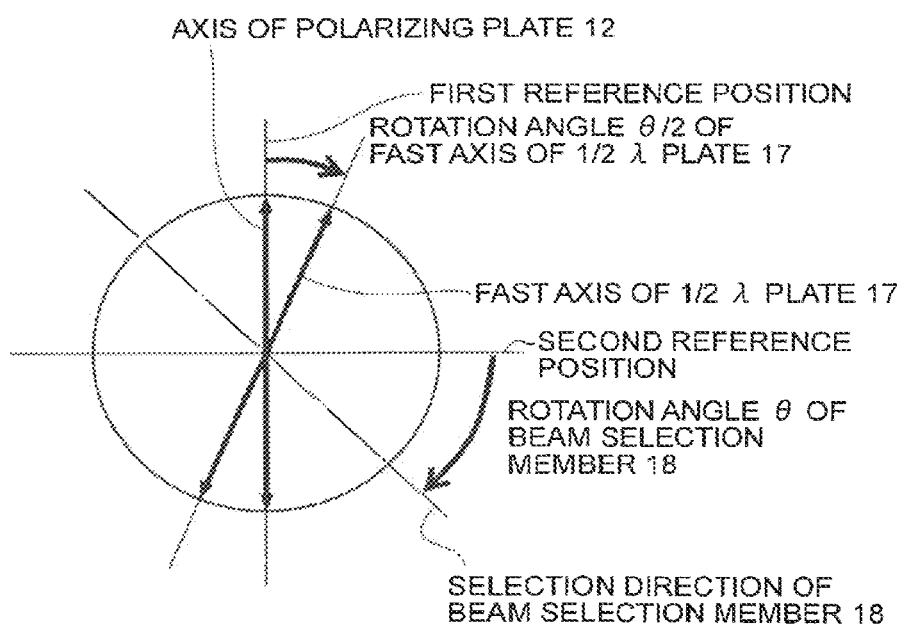

As illustrated in FIG. 3B, the ½ wavelength plate 17 is constructed so as to rotate in the same direction as the rotation of the beam selection member 18 at ½ rotation speed thereof. In concrete terms, when the direction of the fast axis of the ½ wavelength plate 17 rotates to the right (viewed from the microscope, this definition is the same hereinbelow) from the first reference position by the rotation angle θ/2, the beam selection direction of the beam selection member 18 rotates to the right from the second reference position by the rotation angle θ. This mechanism for rotating the ½ wavelength plate 17 at the rotation speed that is ½ of the rotation speed of the beam selection member 18 can be implemented by setting the gear ratio of each gear of the ½ wavelength plate 17 and the beam selection member 18, which engage with the rotational driving axis of the single rotational driving device 24 at 2:1.

Figure 4A:
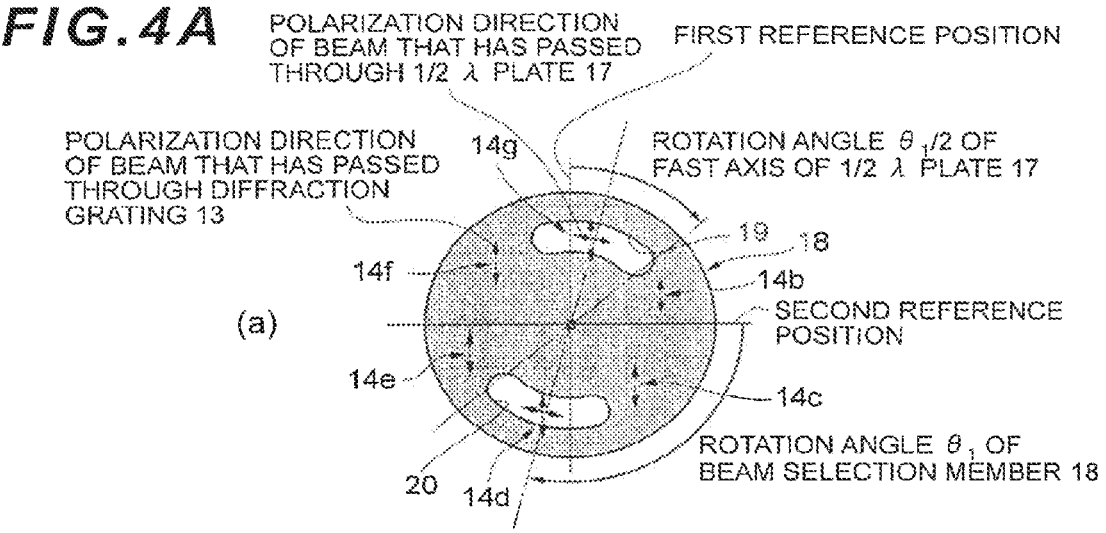
FIGS. 4A, 4B, and 4C are diagrams depicting a relationship of a rotation angle of the beam selection member used for Embodiment 1 and the beams to be selected (FIG. 4A is a case when the rotation angle of the beam selection member is $\theta_1$ to the right, FIG. 4B is a case when the rotation angle of the beam selection member is $\theta_2$ to the right, and FIG. 4C is a case when the rotation angle of the beam selection member is $\theta_3$ to the left)

If the beam selection direction of the beam selection member 18 is rotated to the right from the second reference position by the rotation angle $\theta_1$ using this mechanism, as illustrated in FIG. 4A, so as to select a pair of ± first order di acted lights 14g and 14d which belong to the first group of beams, out of the three pairs of ± first order clawed lights, the direction of the fast axis of the ½ wavelength plate 17 rotates to the right from the first reference position by the rotation angle $\theta_1/2$. While the polarization direction (indicated by a broken line with bidirectional arrows) of each ± first order diffracted light before, passing through the ½ wavelength plate 17 is parallel with the direction of the axis of the polarizing plate 23 at this time, the polarization direction of each ± first order diffracted light after passing through the ½ wavelength plate 17 rotates to the right by the rotation angle $\theta_1$ (in FIG. 4A, only the polarization directions of the pair of ± first order diffracted lights 14g and 14d selected by the beam selection member 18 are indicated by a solid line with bidirectional arrows), and is perpendicular to the beam selection direction of the beam selection member 18 (matches with the splitting direction $V_1$ indicated in FIG. 2A).

Figure 4B:
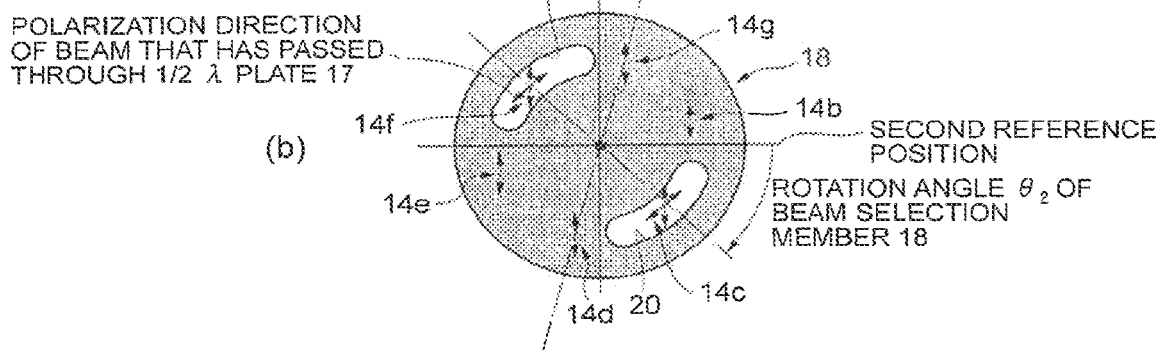

In the same manner, if the beam selection direction of the beam selection member 18 is rotated to the right from the second reference position by the rotation angle $\theta_2$, as illustrated in FIG. 4B, so as to select a pair of ± first order diffracted lights 14c and 14f which belong to the second group of beams, out of the three pails of ± first order diffracted lights, the direction of the fast axis of the ½ wavelength plate 17 rotates to the right from the first reference position by the rotation angle $\theta_2/2$. While the polarization direction (indicated by a broken line with bidirectional arrows) of each ± first order diffracted light before passing through the ½ wavelength plate 17 is parallel with the direction of the axis of the polarizing plate 23 at this time, the polarization direction of each ± first order diffracted light after passing through the ½ wavelength plate 17 rotates to the right by the rotation angle $\theta_2$ (in FIG. 4B, only the polarization directions of the pair of ± first order diffracted lights 14c and 14f selected by the beam selection member 18 are indicated by a solid line with bidirectional arrows), and is perpendicular to the beam selection direction of the beam selection member 18 (matches with the splitting direction $V_2$ indicated in FIG. 2A).

Figure 4C:
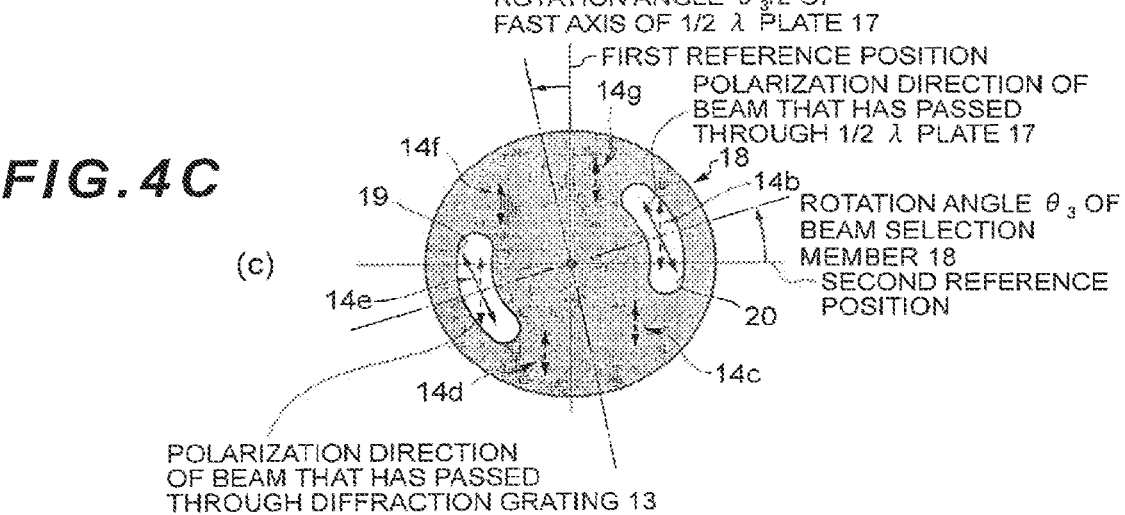

If the beam selection direction of the beam selection member 18 is rotated to the left (viewed from the microscope, this definition is the same hereinbelow) from the second reference position by the rotation angle $\theta_3$ as illustrated in FIG. 4C, so as to select a pair of ± first order diffracted lights 14b and 14e which belong to the third group of beams, out of the three pairs of ± first order diffracted lights, the direction of the fast axis of the ½ wavelength plate 17 rotates to the left from the first reference position by the rotation angle $\theta_3/2$. While the polarization direction (indicated by a broken line with bidirectional mows) of each ± first order diffracted light before passing through the ½ wavelength plate 17 is parallel with the direction of the axis of the polarizing plate 23 at this time, the polarization direction of each ± first order diffracted light after passing through the ½ wavelength plate 17 rotate to the left by the rotation angle $\theta_3$ (in FIG. 4C, only the polarization directions of the pair of ± first order diffracted lights 14b and 14e selected by the beam selection member 18 are indicated by a solid line with bidirectional arrows), and is perpendicular to the beam selection direction of the beam selection member 18 (matches with the splitting direction. $V_3$ indicated in 2A).

By rotating the ½ wavelength plate 17 in the sane direction as the rotation of the beam selection member 18 at a half of the rotation speed thereof like this, a pair of ± first order diffracted lights selected by the beam selection member 18 can always be in a polarization state having a field oscillation direction that is perpendicular to the splitting direction (diffraction direction) of the selected pair of ± first order diffracted lights (parallel with the rotation direction of the beam selection member 18), therefore all the ± first order diffracted lights selected by the beam selection member 18 can be S-polarized on the irradiation surface. FIG. 5 is a schematic diagram depicting the function of the illumination optical system 10 (particularly the diffraction grating 13, the ½ wavelength plate 17, and the beam selection member 18) described above. In FIG. 5, a bidirectional arrow enclosed by a circle indicates the polarization direction of the beam, and a bidirectional arrow enclosed by a square indicates the axial direction of the optical element.

As illustrated in FIG. 6, a plurality of (six in the case of FIG. 6) notches 21, 21, . . . are formed on the periphery of the beam selection member 18, and the rotation angle of the beam selection member 18 can be detected by the timing sensor 22 detecting a notch 21.

As described above, the diffracted light (± first order diffracted lights), of which diffraction direction and diffraction order are selected by the beam selection member 18 and of which polarization state is controlled by the ½ wavelength plate 17 forms a conjugate surface with the diffraction grating 13 near the field stop 26, by the lens 25, is converted into parallel light by the field lens 27, reflected by the dichroic mirror 7 via the exciter filter 28, and is collected on the pupil plane 6a of the objective lens 6 again for each diffraction order, as illustrated in FIG. 1. Each beam (diffracted light) emitted from the objective lens becomes a parallel beam as the illumination light, and is irradiated onto the specimen 5. In this case, each beam (diffracted light) is coherent light, therefore it irradiates the specimen 5 as light having the structure of interference fringes with equal intervals. The illumination light having a fringe structure is called "structured illumination light", and this illumination method is called "structured illumination method".

If the specimen 5 is illuminated by the structured illumination light, moire interference fringes are generated by the interference between the periodic structure of the illumination light and the periodic structure of the specimen 5, but these moire interference fringes can enter the objective lens 6, because moire interference fringes have a lower frequency than the original frequency even if high frequency shape information of the specimen 5 is included.

The light (fluorescence), which is generated from the surface of the specimen 5 ark enters the objective lens 6, is converted into parallel light by the objective lens 6, is transmitted through the dichroic mirror 7 and the barrier filter 31, and forms an image of the specimen on the imaging plane 36 of the picture element 35 by the second objective lens 32.

The picture element 35 captures an image formed by the image optical system 30, and outputs image signals to the image storing and computing device 40. The image captured by the picture element 35 is an image generated by being illuminated by spatially modulated illumination light (structure illumination light), hence a super resolution image of the specimen 5 (specimen image) is generated by restoring the image by the image storing and computing device 40 using inverse modulation based on born predetermined image processing. For example, a method disclosed in U.S. Pat. No. 8,115,806 can be used. The super resolution image of the specimen 5 (specimen image) generated by the image storing and computing device 40 is stored in an internal memory (not illustrated), and is displayed on the image display device 45.

To restore the original image by image processing, the same specimen 5 may be imaged with modulating the phase of the interference fringes by illumination three or more times. Because a modulated image includes three unknown parameters (0 order component, + first order component, and − first order component) in the optical information which is obtained when the frequency component of the specimen diffracted by the structured illumination, and in order to determine the unknown parameters by arithmetic processing, a plurality of images exceeding the number of the unknown parameters are required.

According to this embodiment, in order to modulate the phase of the interference fringes generated by the illumination light, the diffraction grating 13 is driven in a direction perpendicular to the optical axis of the illumination optical system 10 (x direction in FIG. 7A) using the translational driving device 15 as illustrated in FIG. 7A. In this case, the driving amount of the diffraction grating 13 is different depending on the direction of the diffracted light, which is selected by the beam selection member 18. In concrete terms, when P denotes the cycle (pitch) of the diffraction grating 13, and θ denotes an angle formed by the direction of the wave vector of the diffraction grating 13 (three directions indicated by the dashed lines in the drawing) and the driving direction of the diffraction grating 13 by the translational driving device 15 ($\theta_1$ to $\theta_3$ in FIG. 7B corresponds to $\theta_1$ to $\theta_3$ in FIG. 4) as illustrated in FIG. 7B, the distance L to drive the diffraction grating 13 for the phase modulation amount of the structured illumination (interference fringes generated by the illumination light) to be a predetermined value φ is given by the following Expression 1.

$$L = \phi \times P/(4\pi \times |\cos \theta|) \quad (1)$$

To establish $\phi = 2\pi$, $L = P/(2 \times |\cos \theta|)$, which appears to be using only a half cycle of the diffraction grating 13, but this is because the structured illumination in this embodiment utilizes the interference of ± first order diffracted lights.

In this embodiment, in order to acquire two-dimensional super resolution image data, ± first order diffracted lights are generated in three directions of which inclinations are 120° different from each other, by the diffraction grating 13, as mentioned above, and images on the ± first diffracted lights in three directions are acquired by selecting ± first order diffracted lights in one direction at a time out of the three directions, by rotating the beam selection member 18. In this case, each phase-modulated image can be acquired according ID the following sequence. In the following description, it is assumed that the phase modulation of the illumination light (interference fringes) is performed three times for the illumination light (± first order diffracted lights) in each direction.

First as illustrated in FIG. 4A, the beam selection direction of the beam selection member 18 is stopped at a position that is rotated to the right from the second reference position by the rotation angle $\theta_1$, and a pair of ± first order diffracted lights 14g and 14d is selected as the illumination light. In this case, the fast axis of the ½ wavelength plate 17 stops at a position that is rotated to the right from the first reference position by the rotation angle $\theta_1/2$. During this time, the diffraction grating 13 is intermittently or continuously moved by the translational driving device 15 in a direction (direction of the angle $\theta_1$ in FIG. 7B) that corresponds to the diffraction direction of the ± first order diffracted lights 14g and 14d (corresponds to the splitting direction $V_1$ indicated in FIG. 2P), so that the first phase image is acquired at the first movement position in this direction, then the second phase image is acquired at the second movement position, and finally the third phase image is acquired at the third movement position.

Then, as illustrated in FIG. 4B, the beam selection direction of the beam selection member 18 is stopped at a position that is rotated to the right from the second reference position by the rotation angle $\theta_2$, and a pair of ± first order diffracted lights 14c and 14f is selected as the illumination light tri this case, the fast axis of the ½ wavelength plate 17 stops at a position that is rotated to the right born the first reference position by the rotation angle $\theta_2/2$. During this time, the diffraction grating 13 is intermittently or continuously moved by the translational driving device 15 in a direction (direction of the angle $\theta_2$ in FIG. 7B) that corresponds to the diffraction direction of the ± first order diffracted lights 14c and 14f (corresponds to the splitting direction $V_2$ indicated in FIG. 2A), so that the first phase image is acquired at the first movement position in this direction, then the second phase image is acquired at the second movement position, and finally the third phase image is acquired at the third movement position.

Then as illustrated in FIG. 4C, the beam selection direction of the beam selection member 18 is stopped at a position that is rotated to the left from the second reference position by the rotation angle $\theta_3$, and a pair of ± first order diffracted lights 14b and 14e is selected as the illumination light. In this case, the fast axis of the ½ wavelength plate 17 stops at a position that is rotated to the left from the first reference position by the rotation angle $\theta_3/2$. During this time, the diffraction grating 13 is intermittently or continuously moved by the translational driving device 15 in a direction (direction of the angle $\theta_3$ in FIG. 7B) that corresponds to the diffraction direction of the ± first order diffracted lights 14b and 14e (corresponds to the splitting direction $V_3$ indicated in FIG. 2A), so that the first phase image is acquired at the first movement position in this direction, then the second phase image is acquired at the second movement position, and finally the third phase image is acquired at the third movement position.

In this embodiment, the ½ wavelength plate 17 is rotated in the same direction as the rotation of the beam selection member 18 at ½ rotation speed thereof, whereby the illumination light (a pair of ± first order diffracted lights) selected by the beam selection member 18 enters the specimen 5 as S-polarized light, but the present invention is not limited to this mode, and modes of rotation of the ½ wavelength plate 17 and the beam selection member 18 can be freely set, e.g. rotating the ½ wavelength plate 17 and the beam selection member 18 in opposite directions, only if the illumination light selected by the beam selection member 18 results in S-polarized light. In concrete terms, in the case of FIG. 4A, the beam selection direction of the beam selection member 18 is in a position that is rotated to the right from the second reference position by the rotation angle $\theta_1$, and if the pair of ± first order diffracted lights 14g and 14d is selected as the illumination light, the position of the fast axis of the ½ wavelength plate 17, to generate a polarization state in which the pair of ± first order diffracted lights 14g and 14d is irradiated onto the specimen 5 as the S-polarized light, is not limited to the position that is rotated to the right titan the first reference position by the rotation axis $\theta_1/2$.

In other words, the position that is rotated from this position by ±90° (that is, the position that is rotated to the left from the first reference position by 90°−$\theta_1/2$, which results in the same position as the position that is rotated to the right from the first reference position by $\theta_1/2+90°$) is also a position where the same polarization state is generated. Therefore in the case of rotating the beam selection direction of the beam selection member 18 to the right from the second reference position by the rotation axis $\theta_1$, the same functional effect can be implemented by rotating the fast axis of the ½ wavelength plate 17 to the left from the first reference position by 90°−$\theta_1/2$, for example, hence this latter mode may be used instead. The first reference position and the second reference position mentioned above are not limited to the positions indicated in FIG. 4, but may be set at any appropriate positions.

Embodiment 2

Figure 8:
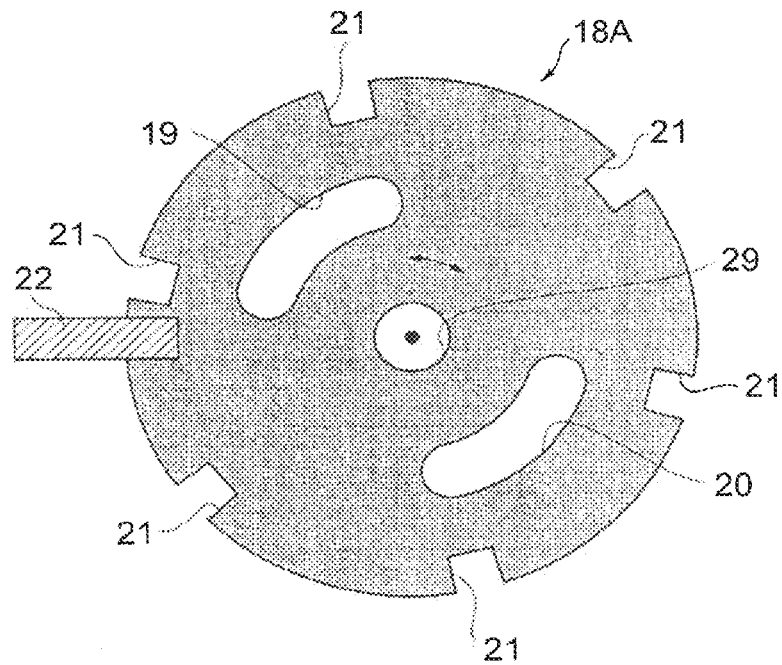
FIG. 8 is a diagram depicting a configuration of a beam selection member that is used for a structured illumination microscope device according to Embodiment 2 of the present invention.

A structured illumination microscope device according to Embodiment 2 of the present invention is the structured illumination microscope device 1 according to Embodiment 1 depicted in FIG. 1, where the beam selection member 18A illustrated in FIG. 8 is used instead of the beam selection member 18, and the other configuration is the same as Embodiment 1. The functional aspects are also the same as Embodiment 1, except for the difference generated by using the beam selection member 18A. Hence in the description in Embodiment 2, the drawings used for describing Embodiment 1, including FIG. 1, are referred to when needed, and description on matters the same as Embodiment 1 is omitted.

The only difference of the beam selection member 18A illustrated in FIG. 8 from the beam selection member 18 of Embodiment 1 illustrated in FIG. 6 is that there is a third aperture 29 at the center, and the rest of the configuration is the same as the beam selection member 18. Therefore in the beam selection member 18A illustrated in FIG. 8, a composing element the same as the beam selection member 18 illustrated in FIG. 6 is denoted with a same reference symbol as used in FIG. 6, for which detailed description is omitted.

The third aperture 29 of the beam selection member 18A illustrated in FIG. 8 is configured such that the 0 order diffracted light 14a (see FIG. 2B), which is cut off in the beam selection member 18 illustrated in FIG. 6, is allowed to pass through, in other words, the structured illumination microscope device of Embodiment 2, which uses the beam selection member 18A, uses the 0 order diffracted light 14a that passes through the third aperture 29 along with the pair of ± first order diffracted light that passes through the first aperture 19 and the second aperture 20 (one of the pairs of 14g and 14d, 14c and 14f, and 14b and 14e as illustrated in FIG. 2B), and this is the major difference from the structured illumination microscope device of Embodiment 1.

Figure 9:
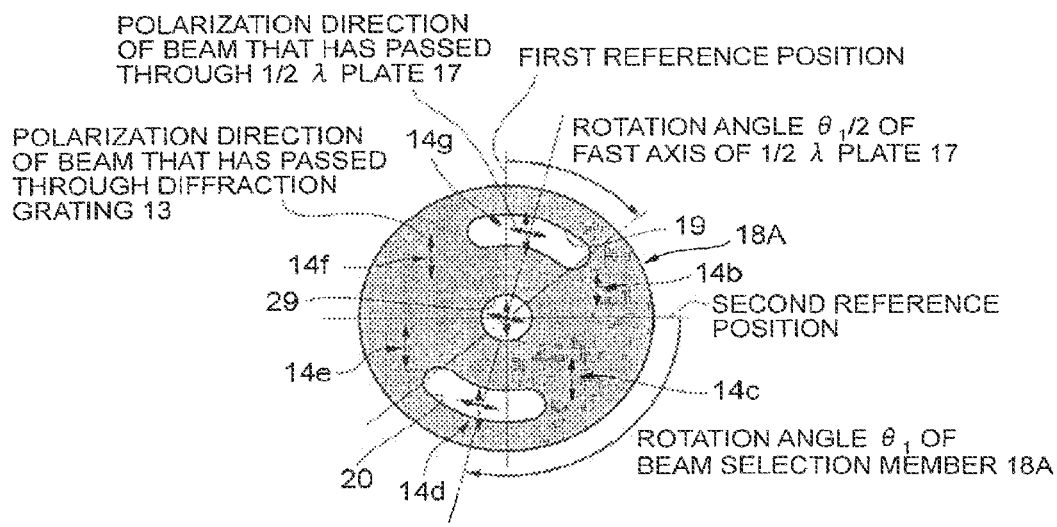
FIG. 9 is a diagram depicting a relationship of a rotation angle of the beam selection member used for Embodiment 2 and beams to be selected.

In concrete terms, if the 0 order diffracted light 14a and a pair of ± first order cliff-acted light 14g and 14d (first group of beams) are selected as the illumination light, for example, the beam selection direction of the beam selection member 18A is stopped at a position that is rotated to the right from the second reference position by the rotation axis $\theta_1$, as illustrated in FIG. 9. In this case, the fast axis of the ½ wavelength plate 17 (see FIG. 5) stops at a position that is rotated to the right from the first reference position by the rotation angle $\theta_1/2$.

In this state, the 0 order diffracted light 14a and the pair of ± first order diffracted lights 14g and 14d are selected by the beam selection member 18A as the illumination light, and the selected diffracted lights 14a, 14g and 14d are polarized by the ½ wavelength plate 17 to be S-polarized light when irradiated onto the specimen 5 (see FIG. 1). If the 0 order diffracted light 14a and the pair of ± first order diffracted lights 14c and 14f (second group of bears) are selected as the illumination light, the beam selection member 18A is set in the same state as the beam selection member 18 illustrated ha FIG. 4B, and if the 0 order diffracted light 14a and the pair of ± first order diffracted lights 14b and 14e (third group of beams) are selected as the illumination light, the beam selection member 18A is set in the same state as the beam selection member 18 illustrated in FIG. 4C.

If beams of each group are selected as the illumination light, the diffraction grating 13 is moved to modulate the phase of the illumination light, and an image of the specimen 5 is acquired each time the phase is modulated, just like Embodiment 1. A number of times of performing the phase modulation can be three, as in the case of Embodiment 1, but the number may be different. For example, the phase modulation may be performed five times at each of the three selected positions, whereby a total of 15 images, five phases in three directions, can be acquires.

Embodiment 3

Figure 10:
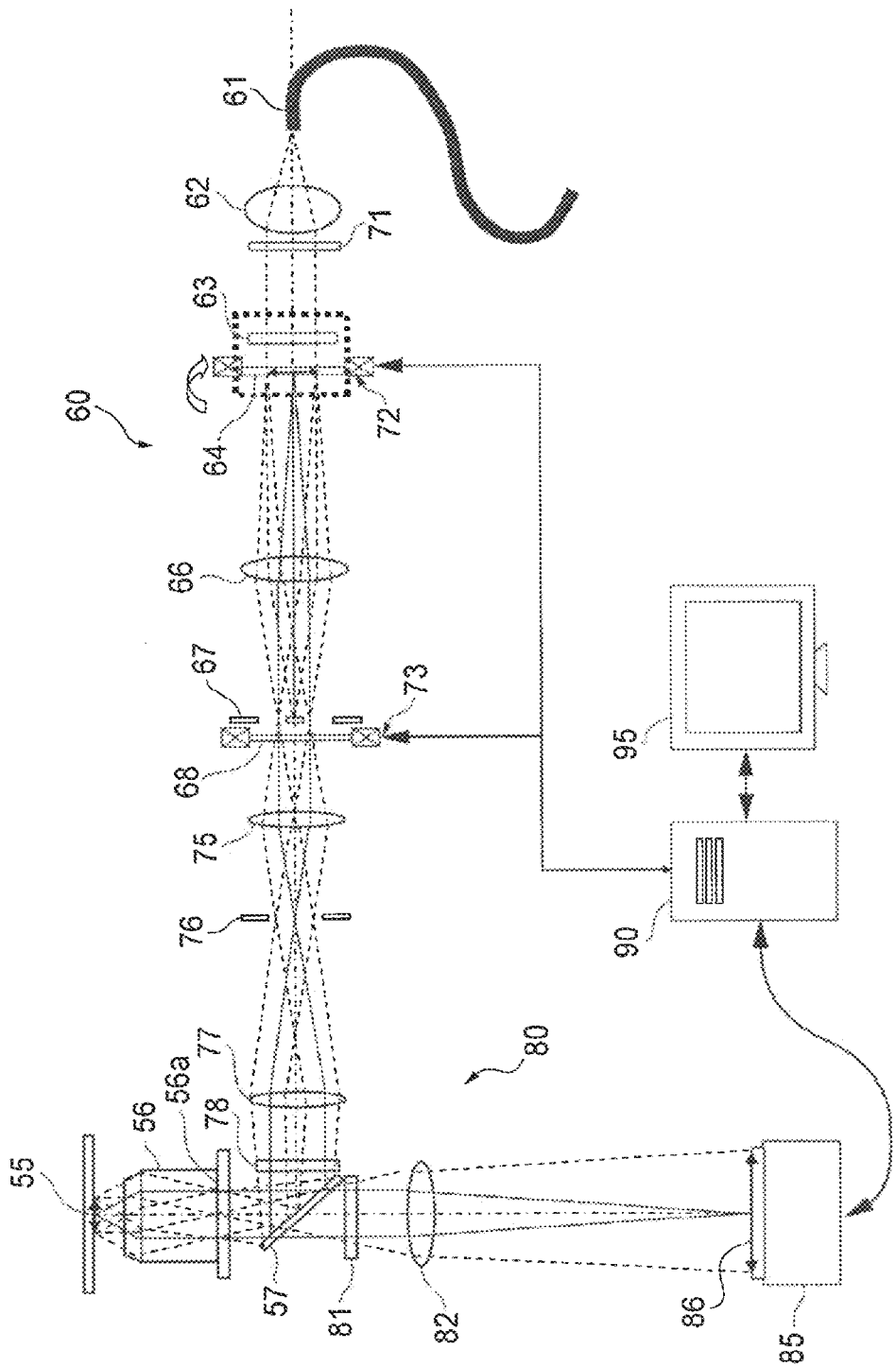
FIG. 10 is a diagram depicting an overview of an optical system of a structured illumination microscope device according to Embodiment 3 of the present invention.

As illustrated in FIG. 10, a structured illumination microscope device 51 according to Embodiment 3 is used for similar purposes as Embodiment 1 and Embodiment 2 described above, and is constituted mainly by an objective lens 56, a dichroic mirror 57, an illumination optical system 60 (structured illumination optical system according to this embodiment) that includes the objective lens 56 and the dichroic mirror 57, an image optical system 80 that also includes the objective lens 56 and the dichroic mirror 57, a picture element 85 (e.g. CCD and CMOS), an image storing and computing device 90, and an image display device 95.

The illumination optical system 60 includes, in order from the light source: an optical fiber 61, a collector lens 62, a ½ wavelength plate 63, a diffraction grating 64, a collective lens 66, a light shielding plate 67, a phase plate 68, a lens 75, a field stop 76, a field lens 77, an exciter filter 78, a dichroic mirror 57, and an objective lens 56. The image optical system 80 includes, in order from an object (specimen 55): the objective lens 56, the dichroic mirror 57, a barrier filter 81, and a second objective lens 82. The image storing and computing device 90 (or controller) is electrically connected with rotational driving devices 72 and 73, which are described later, so as to control operation of the rotational driving devices 72 and 73, and constitute an image processing unit according to this embodiment.

The light from the light source (not illustrated) is guided by the optical fiber 61, and the light emitted from the optical fiber 61 is transformed into parallel light by the collector lens 62. A laser light, for example, is used as the light source, since the illumination light must be coherent light. If a laser light is used, a polarization-preserving single mode fiber, for example, is used as the optical fiber 61.

In this embodiment, a polarizing plate 71 is disposed between the collector lens 62 and the ½ wavelength plate 63. If a laser light is used as the light source, the polarization state thereof at the emitting end of the optical fiber 61 is approximately in a linearly polarized state, but it is preferable to pass the laser light through the polarizing plate 71 so as to remove the other polarization components. The axis of the polarizing plate 71 is matched with the polarization plane (direction of the oscillation axis of the electric field) if the emitted light from the optical fiber 61 is polarized, but can be any direction if the emitted light from the optical fiber 61 is not polarized.

The ½ wavelength plate 63 transforms the polarization direction of the parallel light (coherent light) that enters from the collector lens 62 the polarizing plate 71 into a pr determined direction of linearly polarized light. The direction of the fast axis of the ½ wavelength plate 63 is set to a direction to be the S-polarized light when a plurality of beams (0 order diffracted light 65a and ± first order diffracted lights 65b and 65c (see FIG. 11B) described later) split by the diffraction gating 64 is irradiated onto the specimen 55 after passing through the ½ wavelength plate 63, specifically to a direction that is perpendicular to the beam splitting direction W (indicated by the dashed line in FIG. 11A) of the diffraction gating 64 to be described below (a direction parallel with the grid line (marked line) of the diffraction grating 64).

The diffraction grating 64 constitutes the beam splitting unit (or beam splitter) according this embodiment and has a one-dimensional periodic structure in a direction perpendicular to the optical axis of the illumination optical system 10, as illustrated in FIG. 11A. This periodic structure may be a periodic structure formed by using density (transmittance), or a periodic structure formed by using a difference (phase difference), but the phase difference type periodic structure is preferable in that the diffraction efficiency of the ± first order light is high.

The diffraction grating 64 splits the linearly polarized light that enters from the ½ wavelength plate 63 into a plurality of beams along the beam splitting direction W (see FIG. 11A) of the diffraction grating 64, and generates a plurality of diffracted light (e.g. 0 order diffracted light 65a and ± first order diffracted lights 65b and 65c illustrated in FIG. 11B), of which propagating directions (diffraction directions) are symmetric with respect to the optical axis. The beam splitting direction W matches the directions of the wave vector of the diffraction gating 64 (direction perpendicular to the grid line (marked line) of the diffraction grating 13).

Each of the plurality of diffracted lights generated by the diffraction grating 64 is collected at a position within a pupil conjugate plane by the collective lens 66 illustrated in FIG. 10, according to the diffraction direction and the diffraction order of each diffracted light. For example, as illustrated in FIG. 11B, the 0 order diffracted light 65a is collected at the center of the pupil conjugate plane (position of the optical axis), and the pair of ± first order diffracted lights 65b and 65c are collected at symmetric positions with respect to the 0 order diffracted light 65a (position of the optical axis).

As illustrated in FIG. 10, the diffraction grating 64 is constructed so that rotational driving device 72, e.g. electric motor, can rotate the diffraction gating 64 together with the ½ wavelength plate 63 disposed near the diffraction grating 64, around the center of the diffraction grating 64 (optical axis of the illumination optical system 60) as the rotation axis. By rotating the ½ wavelength plate 63 and the diffraction grating 64, a diffracted light having a desired di action direction and a diffraction order (± first order diffracted light) can be used as the illumination light, and as a result, the structured illumination direction can be selected.

Figure 12A:
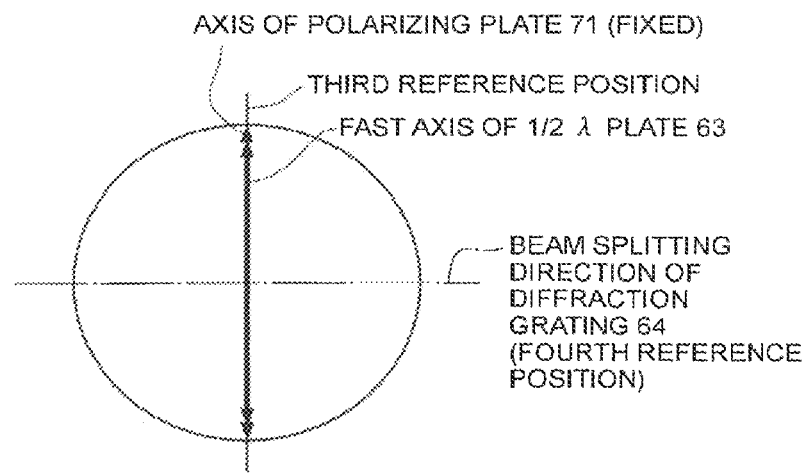
FIGS. 12A and 12B are diagrams depicting a relationship between a ½ wavelength plate that is used for Embodiment 3 and each rotation angle of the diffraction grating (FIG. 12A is a state of being in a reference position, and FIG. 12B is a state of being rotated from the reference position)

The rotation angles of the ½ wavelength plate 63 and the diffraction grating 64 are controlled as follows. As illustrated in FIG. 12A, the reference position of the ½ wavelength plate 63 is a position where the direction of the fast axis thereof is parallel with the direction of the axis of the polarizing plate 71 (hereafter called "third reference position"), and the reference position of the diffraction grating 64 is a position where the beam splitting direction of the diffraction grating 64 is perpendicular to the direction of the axis of the polarizing plate 71 (hereafter called "fourth reference position").

Figure 12B:
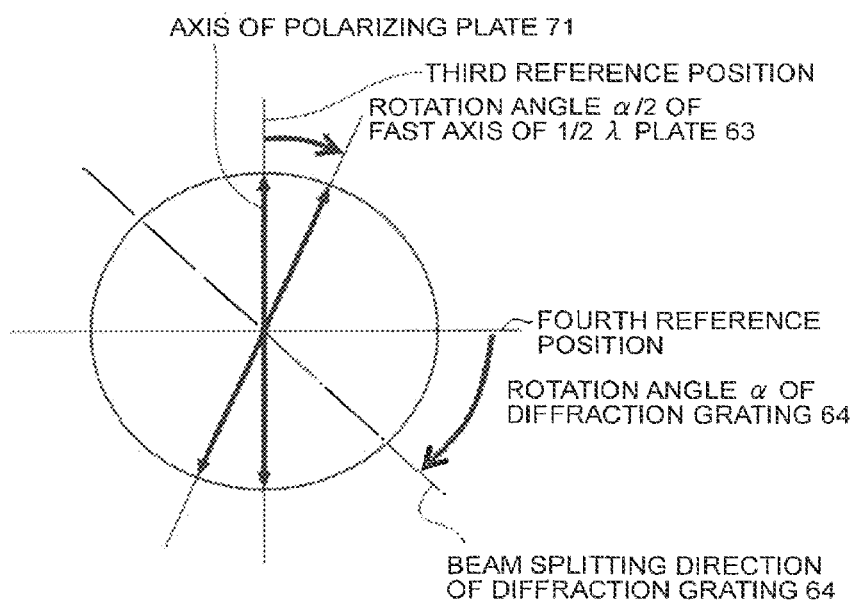

As illustrated in FIG. 12B, the ½ wavelength plate 63 is constructed so as to rotate in the same direction as the rotation of the diffraction grating 64 at ½ rotation speed thereof. In concrete terms, when the direction of the fast axis of the ½ wavelength plate 63 rotates to the right (viewed from the microscope, this definition is the same hereinbelow) from the third reference position by the rotation angle $\alpha/2$, the beam splitting direction of the diffraction grating 64 rotates to the right from the fourth reference position by the rotation angle $\alpha$. This mechanism for rotating the ½ wavelength plate 17 at a rotation speed that is ½ of the rotation speed of the diffraction rating 64 can be implemented by setting the gear ratio of each gear of the ½ wavelength plate 63 and the diffraction grating 64, which engage with the rotational driving axis of the rotational driving device 72, at 2:1.

Figure 13:
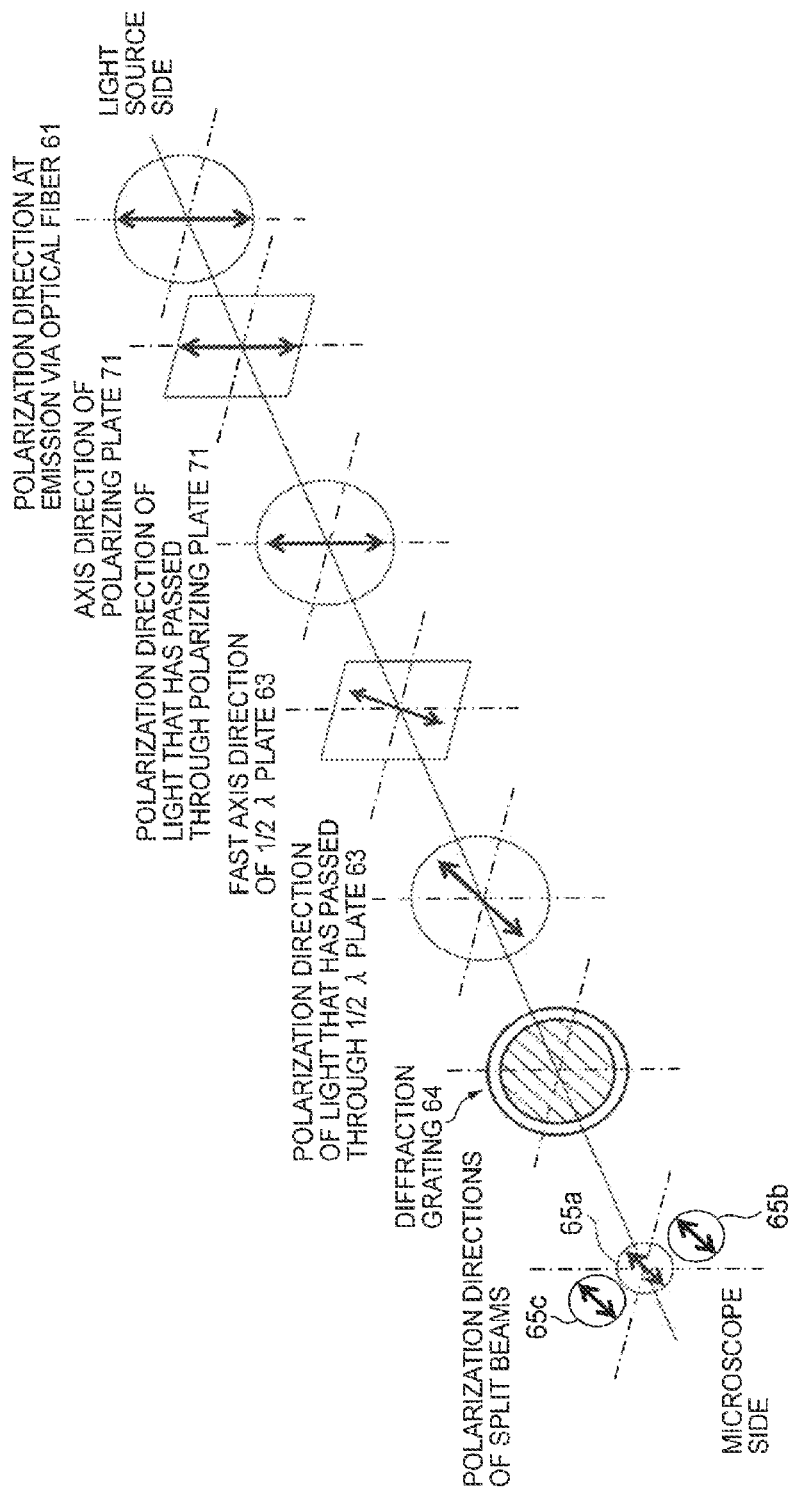
FIG. 13 is a schematic diagram depicting a function of an illumination optical system according to Embodiment 3.

By rotating the ½ wavelength plate 63 in the same direction as the rotation of the diffraction grating 64 at half of the rotation speed thereof like this, the diffracted light split by the diffraction grating 64 can always be in a polarized state having a field oscillation direction that is perpendicular to the beam splitting direction (diffraction direction) of the diffraction grating 64 (parallel with the rotation direction of the diffraction grating 64), therefore all the diffracted light that passes through the diffraction grating 64 can be S-polarized light emitted onto the irradiation surface, FIG. 13 is a schematic diagram depicting the function of the illumination optical system 60 (particularly the ½ wavelength plate 17 and the diffraction grating 64) described above. In FIG. 13, a bidirectional arrow enclosed by a circle indicates the polarization direction of the beam, and a bidirectional arrow enclosed by a square indicates the axial direction of the optical element.

As described above, the diffracted light, of which polarization state is controlled by the ½ wavelength plate 63 and of which diffraction direction and diffraction order are controlled by the diffraction gating 64, forms a conjugate surface with the diffraction grating 64 near the light shielding plate 67 by the lens 66, where 0 order diffracted light and second or higher order diffracted lights are cut off by the light shielding plate 67, and only the ± first order diffracted lights enter the phase plate 68 as illustrated in FIG. 10. Since only the ± first order diffracted lights are used as the illumination light in this embodiment, the 0 order diffracted light indicated by the solid line in FIG. 10 does not actually exist after the light shielding plate 67, but is illustrated out of convenience, just like the case of Embodiment 1. The 0 order diffracted light may be used as the illumination light, just like Embodiment 2.

The phase plate 68 has a thickness of a transparent substrate or has a deposited thin film of which film thickness is controlled, so that an appropriate phase delay is generated on one or both of the entered beam(s) (± first order diffracted light(s)). Thereby a phase difference is generated between the + first order diffracted light and the – first order diffracted light. The phase difference can be modulated by the rotational driving device 73 rotating the phase plate 68 around the optical axis, changing the positions where the ± first order diffracted lights passes through the phase plate 68.

The beams (± first order diffracted light), of which phases are modulated by the phase plate 68 form a conjugate surface with the diffraction grating 64 near the field stop 76 by the lens 75, are converted into parallel light by the field lens 77, reflected by the dichroic mirror 57 via the exciter filter 78, and are collected on the pupil plane 56a of the objective lens 56 again for each diffraction order. Each beam (diffracted light) emitted from the objective lens becomes a parallel beam as the illumination light, and is irradiated onto the specimen 55. In this case, each beam (diffracted light) is coherent light, therefore each beam is irradiated onto the specimen 55 as the structured illumination light having a structure of interference fringes with equal intervals.

If the specimen 55 is illuminated by the structured illumination light, moire interference fringes are generated by the interference between the periodic structure of the illumination light and the periodic structure of the specimen 55, but the moire interference fringes can enter the objective lens 56, because moire interference fringes have a lower frequency than the original frequency, even if high frequency shape information of the specimen 55 is included.

The light (fluorescence), which is generated from the surface of the specimen 55 and enters the objective lens 56, is converted into parallel light by the objective lens 56, is transmitted through the dichroic mirror 57 and the barrier filter 81, and forms an image of the specimen on the imaging plane 86 of the picture element 85 by the second objective lens 82.

The picture element 85 captures an image formed by the image optical system 80, and outputs image signals to the image storing and computing device 90. The image captured by the picture element 85 is an image generated by being illuminated by the spatially modulated illumination light (structured illumination light), hence a super resolution image of the specimen 55 (specimen image) is generated by restoring the image by the image storing and computing device 90 using inverse modulation based on a known predetermined image processing. The super resolution image of the specimen 55 (specimen image) generated by the image storing and computing device 90 is stored in an internal memory (not illustrated), and is displayed on the image display device 95.

To restore the original image by image processing, the same specimen 55 may be imaged with modulating the phase of the interference fringes by illumination light three or more times due to the same reason as described in Embodiment 1. In this embodiment, the phase plate 68 is rotated by the rotational driving device 73 to modulate the phase of the interference fringes by the illumination light, as described above, but the phase modulation may be performed by driving the diffraction grating 64 translation ally in the beam splitting direction (direction in which diffraction is generated). In this case, the phase plate 68 is not necessary.

In this embodiment, where the diffraction grating 64 rotates, the structured illumination light (± first order diffracted light) can be irradiated onto the specimen 55 in any direction around the optical axis of the objective lens 56 in order to acquire two-dimensional super resolution image data, and in concrete terms, the structured illumination light can be irradiated from three directions, of which inclination angles are different by 120° turn each other, by rotating the diffraction grating 64 such that the beam splitting direction thereof changes 120° each time, for example. In this case, the phase modulation of the structured illumination light is performed four times at each rotation position of the diffraction grating 64, whereby a total of twelve images, four phases in three directions, can be acquired.

In this embodiment, the ½ Wavelength plate 63 is rotated in the same direction as the rotation of the diffraction grating 64 at ½ rotation speed thereof, whereby the illumination light (a pair of ± first order diffracted light) generated by the diffraction grating 64 enters the specimen 55 as S-polarized light, but the present invention is not limited to this mode, and the modes of rotation of the ½ wavelength plate 63 and the diffraction rating 64 can be freely set, e.g. rotating the ½ wavelength plate 63 and the diffraction grating 64 in opposite directions, only if the illumination light generated by the diffraction grating 64 results in S-polarized light.

In concrete terms, in the case of FIG. 12B, the beam splitting direction of the diffraction grating 64 is in a position that is rotated to the right from the fourth reference position by the rotation angle α, and the position of the fast axis of the ½ wavelength plate 63, in order to generate a polarization state such that the pair of ± first order diffracted lights generated by the diffraction grating 64 is irradiated onto the specimen 55 as S-polarized light, is not limited to a position that is rotated to the right tom the third reference position by the rotation angle α/2.

In other words, the position that is rotated from this position by ±90° (that is, the position that is rotated to the left from the third reference position by 90°×α/2, which results in the same position as the position that is rotated to the right from the third reference position by α/2+90°) is also a position where the same polarization state is generated. Therefore in the case of rotating the beam splitting direction of the diffraction grating 64 to the right turn the fourth reference position by the rotation angle α, the same functional effect can be implemented by rotating the fast axis of the ½ wavelength plate 63 to the left from the third reference position by 90°−α/2, for example, hence this latter mode may be used instead. The third reference position and the fourth reference position mentioned above are not limited to the positions indicated in FIG. 12, but may be set at any appropriate position.

Embodiment 4

Figure 14A:
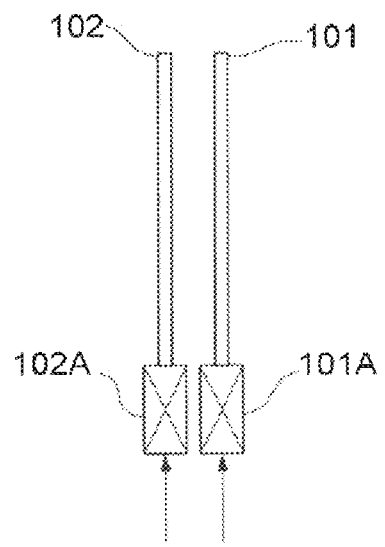
FIG. 14A is a schematic diagram depicting a configuration of liquid crystal elements that are used for Embodiment 4.

In Embodiment 1 described above, the direction of the fast axis of the ½ wavelength plate 17 is set using a configuration that allows the ½ wavelength plate 17 to rotate around the optical axis of the ½ wavelength plate 17, but the direction of the fast axis may be set by disposing at least two liquid crystal elements (first liquid crystal element 101 and second liquid crystal element 102 in order from the light source) as illustrated in FIG. 14A, instead of the ½ wavelength plate 17 in FIG. 1, and allowing the liquid crystal elements to function as the ½ wavelength plate according to the following control.

The axial direction of the polarizing plate 23 is set such that the polarization direction of incoming beams with respect to the diffraction grating 13 is the same as the direction of the grid line (marked line) for the splitting direction $V_1$ of the di action grating 13 indicated in FIG. 2A. Since the first liquid crystal element 101 is an element which can control refractive index anisotropy by electrically controlling the liquid crystal orientation, the first liquid crystal element 101 functions as a ½ wavelength plate for the incoming beams if turned ON by the driving circuit 101A, and functions as a plane parallel plate (refractive index anisotropy is 0, refractive index is isotropic) for the incoming beams if turned OFF by the driving circuit 101A. The direction of the fast axis of the first liquid crystal element 101 in the ON state is a −30° rotated direction from the axial direction of the polarizing plate 23 (+ is the clockwise direction).

The structure of the second liquid crystal element 102 is the same as the structure of the first liquid crystal element 101, and therefore the second liquid crystal element 102 functions as the ½ wavelength plate for the incoming light when turned ON by the driving circuit 102A, and functions as a plane parallel plate for the incoming light if turned OFF by the driving circuit 102A. The direction of the fast axis of the second liquid crystal element 102 in the ON state however is different from the direction of the fast axis of the first liquid crystal element 101, and is set to a +30° rotated direction from the axial direction of the polarizing plate 23.

Figure 14B:
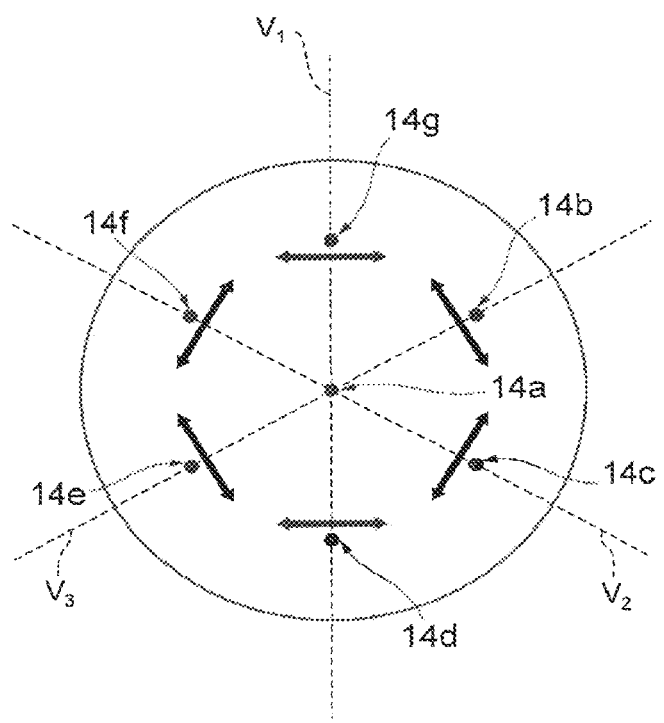
FIG. 14B is a schematic diagram depicting a function as the ½ wavelength plate.

As illustrated in FIG. 14B, if ± first order diffracted light beams that are split in the direction $V_1$ at 0° (a pair of collected points 14g and 14d arranged in the direction $V_1$ at 0°), ± first order diffracted light beams that are split in the direction $V_2$ at 120° (a pair of collected points 14c and 14f arranged in the direction $V_2$ at 120°), and ± first order diffracted light beams that are split in the direction $V_3$ at 240° (a pair of collected points 14b and 14e arranged in the direction $V_3$ at 240°) must be S-polarized when irradiated onto the specimen 5 respectively, that are the polarization direction of each light after passing through the ½ wavelength plate (first liquid crystal element 101 or second liquid crystal element 102) must be in the direction indicated by the arrows in FIG. 14B respectively.

Therefore in the case of the ± first order diffracted light beams split in the direction. $V_2$ at 120°, the direction of the fast axis of the ½ wavelength plate (first liquid crystal element 101) must be set to a direction that is rotated from the axial direction of the polarizing plate 23 by −30° (−30° from the grid line to indicate the splitting direction $V_1$ in FIG. 2A), that is, ½ of the angle formed by the polarization direction of the light alter passing through the ½ wavelength plate (−60° from the grid line to indicate the splitting direction $V_1$ in FIG. 2A) and the polarization direction of the light before passing through the ½ wavelength plate (the same direction as the grid line to indicate the splitting direction $V_1$ in FIG. 2A).

In the case of the ± first order diffracted light beams that are split in the direction $V_3$ at 240°, the direction of the fast axis of the ½ wavelength plate (second liquid crystal element 102) must be set to a direction that is rotated from the axial direction of the polarizing plate 23 by +30° (+30° from the grid lime to indicate the splitting direction $V_1$ in FIG. 2A), that is, ½ of the angle firmed by the polarization direction of the light after passing through the ½ wavelength plate (+60° from the grid line to indicate the splitting direction $V_1$ in FIG. 2A), and the polarization direction of the light bare passing through the ½ wavelength plate (the same direction as the grid line to indicate the splitting direction $V_1$ in FIG. 2A).

Therefore the polarization direction of the beam which has passed through the first liquid crystal element 101 and the second liquid crystal element 102 becomes the same direction as the gild line to indicate the splitting direction $V_1$ in FIG. 2A in a state where both the first liquid crystal element 101 and the second liquid crystal element 102 are turned OFF, becomes the same direction as the grid line to indicate the split direction $V_2$ in FIG. 2A in a state where only the liquid crystal element 101 is turned ON, and becomes the same direction as the grid line to indicate the splitting direction $V_3$ in FIG. 2A in a state where only the liquid crystal element 102 is turned ON.

If the pair of ± first order diffracted lights 14g and 14d which belongs to the first group of beams is selected out of the three pairs of ± first order diffracted lights, as illustrated in FIG. 4A, the direction of the fast axis of the ½ wavelength plate 17 must be set to a direction that is rotated from the axis of the polarizing plate 23 by $+\theta_1/2$, that is ½ of the angle formed by the polarization direction of the light after passing through the ½ wavelength plate 17 (+θ₁ from the axis of the polarizing plate 23) and the polarization direction of the light before passing through the ½ wavelength plate 17 (axial direction of the polarizing plate 23).

In this case, the polarization direction of each ± first order diffracted light before passing through the ½ wavelength plate 17 (indicated by the broken line with bidirectional arrows in FIG. 4A) is parallel with the axial direction of the polarizing plate 23, but the polarization direction of each ± first order diffracted light after passing through the ½ wavelength plate 17 rotates to the right by the rotation angle θ₁ (in FIG. 4A, only the polarization directions of the pair of ± first order diffracted lights 14g and 14d selected by the beam selection member 18 are indicated by the solid line with bidirectional arrows), and becomes perpendicular to the beam selection direction of the beam selection member 18 (matches with the split direction V₁ indicated in FIG. 2A).

In the same manner, if the pair of ± first order diffracted lights 14c and 14f which belongs to the second group of beams is selected out of the three pairs of ± first order diffracted lights, as illustrated in FIG. 4B, the direction of the fast axis of the ½ wavelength plate 17 must be set to a direction that is rotated from the axis of the polarizing plate 23 by +θ₂/2, that is ½ of the angle formed by the polarization direction of the light after passing through the ½ wavelength plate 17 (+θ₂ from the axis of the polarizing plate 23) and the polarization direction of the light before passing through the ½ wavelength plate 17 (axial direction of the polarizing plate 23).

In this case, the polarization direction of each ± first order diffracted light before passing through the ½ wavelength plate 17 (indicated by the broken line with bidirectional arrows in FIG. 4B) is parallel with the axial direction of the polarizing plate 23, but the polarization direction of each ± first order diffracted light after passing through the ½ wavelength plate 17 rotates to the right by the rotation angle θ₂ (in FIG. 4B, only the polarization directions of the pair of ± first order diffracted lights 14c and 14f selected by the beam selection member 18 are indicated by the solid line with bidirectional arrows), and becomes perpendicular to the beam selection direction of the beam selection member 18 (matches with the splitting direction V₂ indicated in FIG. 2A).

Further, if the pair of ± first order diffracted lights 14b and 14e which belongs to the third group of beams is selected out of the three pairs of ± first order diffracted light, as illustrated in FIG. 4C, the direction of the fast axis of the ½ wavelength plate 17 must be set to a direction that is rotated from the axis of the polarizing plate 23 by −θ₃/2, that is, ½ of the angle formed by the polarization direction of the light after passing through the ½ wavelength plate 17 (−θ₃ from the axis of the polarizing plate 23) and the polarization direction of the light before passing though the ½ wavelength plate 17 (axial direction of the polarizing plate 23).

In this case, the polarization direction of each ±fast order diffracted light before passing through the ½ wavelength plate 17 (indicated by the broken line with bidirectional arrows in FIG. 4C) is parallel with the axial direction of the polarizing plate 23, but the polarization direction of each ± first order diffracted light after passing through the ½ wavelength plate 17 rotates to the left by the rotation angle θ₃ (in FIG. 4C, only the polarization directions of the pair of ± first order diffracted lights 14b and 14e selected by the beam selection member 18 are indicated by the solid line with bidirectional arrows), and becomes perpendicular to the beam selection direction of the beam selection member 18 (matches with the splitting direction V₃ indicated in FIG. 2A).

Instead of the ½ wavelength plate 63 in FIG. 10, at least two liquid crystal elements (first liquid crystal element 101 and second liquid crystal element 102 in order from the light source), as illustrated in FIG. 14A, may be disposed and allowed to function as the ½ wavelength plate to set the direction of the that axis according to the above mentioned control.

As described above, according to the structured illumination microscope devices in Embodiment 1 to Embodiment 4 of the present invention, most of the light from the light source can be used as S-polarized structured illumination light, therefore light utilization efficiency can be enhanced.

In Embodiment 1 to Embodiment 4, the direction of the fast axis of the ½ wavelength plate 17 is described based on the assumption that the angle formed by the polarization direction of the light after passing through the ½ wavelength plate 17 and the polarization direction of the light before passing through the ½ wavelength plate 17 (axial direction of the polarizing plate 23) is an acute angle, but may be an obtuse angle (S-polarized light of which phase is different by a value of π).

In the above description, the rotation angle of the ½ wavelength plate 17 with respect to the beam selection direction of the beam selection member 18 or 18A, and the rotation angle of the ½ wavelength plate 63 with respect to the beam splitting direction of the diffraction grating 64, are accurately specified, but an error in the ±5°~6° range is allowed.

It is preferable to use the ½ wavelength plate 17 and the ½ wavelength plate 63 corresponding to the wavelength of the light source, since the phase difference shifts from the original phase difference of the ½ wavelength plate if the wavelength of the light source changes, but a wide-band wavelength plate of which change of phase with respect to the ½ wavelength is small when the wavelength is wide may be used. Even in this case, it is preferable that the phase difference between an ordinary ray and an extraordinary ray is within ±5°. If the phase difference between an ordinary ray and an extraordinary ray is within ±5°, the light intensity change when linearly polarized light is extracted can be kept within 1%.

In Embodiment 1 and Embodiment 2, the rotation of the beam selection member 18 or 18A and the ½ wavelength plate 17 is stopped when a plurality of phase-modulated images is captured, but phase may be modulated while continuously rotating the beam selection member 18 or 18A and the ½ wavelength plate 17, and an image may be captured each time phase is modulated.

In Embodiment 1 and Embodiment 2, the beam selection member 18 or 18A can select only a beam in one direction at a time out of the beams (diffracted light) split into three directions by the diffraction grating 13, but a plurality of beams in mutually different directions may also be selected at one time. In this case, in the structured illumination light to be generated, fringes in a plurality of different directions are superposed.

The function of the ½ wavelength plate used in the present invention (to generate linearly polarized light in an arbitrary direction) may be implemented using two ¼ wavelength plates, but the present invention that uses one ½ wavelength plate has the following advantages over the case of using two ¼ wavelength plates, in addition to cost reduction due to the use of less number of components.

A reflection surface of the optical element on the optical path decreases when one ½ wavelength plate is used, compared with the case of using two ¼ wavelength plates, hence the influence of unwanted reflected light can be decreased. Further, the influence of an error of the wavelength characteristics of each wavelength plate can be decreased when one ½ wavelength plate is used, compared with the case of using two ¼ wavelength plates, hence the use of one ½ wavelength plate is particularly advantageous when a wide-band light is used.

In each of the above mentioned embodiments, the diffraction grating is used as the beam splitting unit, but another optical element, such as a prism or a mask which can rotate or linearly move and on which periodic patterns (a plurality of periodic patterns having mutually different directions of a repetition cycle) are formed, may be used as the beam splitting unit as long as this optical element does not interrupt coherence of the light.

In this case, the fast axis of the ½ wavelength plate is controlled (rotated) so as to be maintained at a ½ position of an angle formed by the polarization direction of the beam that enters the ½ wavelength plate and the polarization direction of the beam that is emitted from the ½ wavelength plate, according to the polarization direction of the beam emitted from the ½ wavelength plate, which is determined depending on the direction perpendicular to the direction of the repetition cycle that rotates or linearly moves according to the rotation or linear movement.

In Embodiment 1, Embodiment 2 and Embodiment 4, the ½ wavelength plate 17 is disposed before (the light source side of) the beam selection member 18 or 18A, but the ½ wavelength plate 17 may be disposed after (the microscope side of) the beam selection member 18 or 18A. In the same manner, in Embodiment 3, the ½ wavelength plate 63 is disposed before (the light source side of) the diffraction grating 64, but the ½ wavelength plate 63 may be disposed after (the microscope side of) the diffraction grating 64.

The present invention can be applied not only to a fluorescent observation device, but also to various observation devices (microscopes) which perform structured illumination.

In this description, the following disclosed documents are incorporated by reference.
1) U.S. Pat. No. 6,239,909
2) U.S. Reissue Pat. No. 38,307
3) U.S. Pat. No. 8,115,806

The invention claimed is:

1. A structured illumination optical system comprising:
a beam splitter configured to split a beam from a light source into a plurality of beams;
first and second liquid crystal elements configured to set a polarization direction of at least some of the plurality of beams, each of the first and second liquid crystal elements being configured to alter the polarization direction when turned on and to function as a plane parallel plate when turned off; and
an objective lens configured to generate an interference fringe on a specimen using at least two of the beams split by the beam splitter.

2. The structured illumination optical system according to claim 1, further comprising a controller configured to control the first and second liquid crystal elements, wherein:
the polarization direction is set to a first direction when the controller turns the first and second liquid crystal elements off;
the polarization direction is set to a second direction when the controller turns the first liquid crystal element on and turns the second liquid crystal element off; and
the polarization direction is set to a third direction when the controller turns the first liquid crystal element off and turns the second liquid crystal element on.

3. The structured illumination optical system according to claim 1, wherein:
the first liquid crystal element is configured, when on, to alter the polarization direction of a said beam incident thereon by +60°; and
the second liquid crystal element is configured, when on, to alter the polarization direction of a said beam incident thereon by −60°.

4. The structured illumination optical system according to claim 1, further comprising a controller configured to control the first and second liquid crystal elements such that the set polarization direction is perpendicular to a splitting direction of the plurality of beams.

5. The structured illumination optical system according to claim 1, wherein:
the structured illumination optical system is configured to change a direction of the interference fringe formed on the specimen, and
the set polarization direction is determined based on the direction of the interference fringe.

6. A structured illumination optical system comprising:
a beam splitter configured to split a beam from a light source into a plurality of beams;
first and second liquid crystal elements configured to set a polarization direction of at least some of the plurality of beams, each of the first and second liquid crystal elements being configured, based on a driving signal, to alter the polarization direction or to function as a plane parallel plate; and
an objective lens configured to generate an interference fringe on a specimen using at least two of the beams split by the beam splitter.

7. The structured illumination optical system according to claim 6, further comprising a controller configured to control the first and second liquid crystal elements, wherein:
the polarization direction is set to a first direction based on a first driving signal output by the controller;
the polarization direction is set to a second direction based on a second driving signal output by the controller; and
the polarization direction is set to a third direction based on a third driving signal output by the controller.

* * * * *